US 10,833,599 B2

(12) United States Patent
Cummings

(10) Patent No.: US 10,833,599 B2
(45) Date of Patent: Nov. 10, 2020

(54) HIGHLY INTERLEAVED CONVERTER FOR RELIABLE POWER PROCESSING

(71) Applicant: MaxOut Renewables, Inc., Livermore, CA (US)

(72) Inventor: Eric Bryant Cummings, Livermore, CA (US)

(73) Assignee: MaxOut Renewables, Inc., Livermore, CA (US)

( * ) Notice: Subject to any disclaimer, the term of this patent is extended or adjusted under 35 U.S.C. 154(b) by 0 days.

(21) Appl. No.: 16/232,888

(22) Filed: Dec. 26, 2018

(65) Prior Publication Data

US 2019/0140554 A1     May 9, 2019

Related U.S. Application Data

(60) Provisional application No. 62/582,015, filed on Nov. 6, 2017.

(51) Int. Cl.
| | |
|---|---|
| H02M 1/32 | (2007.01) |
| H02M 7/44 | (2006.01) |
| H02M 1/08 | (2006.01) |
| H02M 1/14 | (2006.01) |
| H02M 7/00 | (2006.01) |
| H02M 1/00 | (2006.01) |
| H02M 7/48 | (2007.01) |

(52) U.S. Cl.
CPC ............... *H02M 7/44* (2013.01); *H02M 1/08* (2013.01); *H02M 1/14* (2013.01); *H02M 1/32* (2013.01); *H02M 7/003* (2013.01); *H02M 2001/0009* (2013.01); *H02M 2001/325* (2013.01); *H02M 2007/4822* (2013.01)

(58) Field of Classification Search
None
See application file for complete search history.

(56) References Cited

U.S. PATENT DOCUMENTS

| | | | |
|---|---|---|---|
| 6,259,234 B1* | 7/2001 | Perol | H02J 7/35 |
| | | | 323/222 |
| 10,381,918 B1* | 8/2019 | Stoichita | H02M 3/157 |
| 2003/0197245 A1* | 10/2003 | Zhang | H02M 3/1584 |
| | | | 257/531 |
| 2007/0240000 A1* | 10/2007 | Chapuis | G06F 1/189 |
| | | | 713/300 |
| 2012/0049635 A1* | 3/2012 | Schelenz | G05F 1/67 |
| | | | 307/82 |
| 2014/0319916 A1* | 10/2014 | Cummings | H02J 1/102 |
| | | | 307/53 |
| 2016/0028174 A1* | 1/2016 | Jung | H01R 12/88 |
| | | | 439/77 |
| 2016/0126032 A1* | 5/2016 | Sihler | H01H 9/54 |
| | | | 307/113 |
| 2016/0342546 A1* | 11/2016 | Sonnaillon | G06F 13/362 |

* cited by examiner

*Primary Examiner* — Jeffrey A Gblende
(74) *Attorney, Agent, or Firm* — Kilpatrick Townsend & Stockton LLP

(57) ABSTRACT

This specification discloses a novel power converter comprising a large array of interleaved converter channels. As a system, these channels provide high reliability through redundancy. The embodiments described herein solve a reliability and cost issues in converting electrical energy to alternating current (AC) power, with particular application to string inverters for solar power applications.

12 Claims, 22 Drawing Sheets

HIGHLY INTERLEAVED CONVERTER FOR RELIABLE POWER PROCESSING

CROSS-REFERENCE TO RELATED APPLICATIONS

This application claims the benefit of U.S. Provisional Patent Application No. 62/582,015, filed Nov. 6, 2017, the entire contents of which are incorporated herein by reference for all purposes.

FIELD OF THE INVENTION

This patent discloses a novel power converter comprising a large array of interleaved converter channels. As a system, these channels provide high reliability through redundancy. This invention solves reliability and cost issues in converting electrical energy to alternating current (AC) power, with particular application to string inverters for solar power applications.

BACKGROUND

Prior-art interleaved converter systems comprise a small number of converter channels, such as two, three, or four.

SUMMARY

As used herein a power source may comprise single, arrayed, or mixed elements capable of delivering electrical power such a solar cell, Peltier cell, galvanic cell, electrochemical cell, generator, solenoid, piezoelectric cell, acoustoelectric cell, thermoelectric cell, photoelectric cell, radiothermal isotope generator, rotary or linear generator, alternator, battery (lead-acid, lithium, alkaline, etc.).

As used herein, an output load may comprise single, arrayed, or mixed elements capable of drawing electrical power, such as a single, dual, or three-phase power grid, battery, charging circuit, electronic device, electrical device, motor, etc.

As used herein, an interleaved converter is a system of switch-mode power converters, herein called converter channels, having correlated switching cycles, that operate in parallel to adapt power from one or more input sources to one or more output loads. As used herein, an interleaved inverter is an interleaved converter that can supply current bidirectionally.

Preferred embodiments of the present invention comprise a converter channel count greater than 4, some embodiments comprise 8 to 24 converter channels. Some embodiments comprise more than 24 converter channels. An advantage of having a large number of converter channels in an interleaved system is that a system may be made more reliable by redundancy. A further advantage may be the ability to allocate converter capacity dynamically to processing from a plurality of power sources without duplicating capacity. A further advantage may be the ability to allocate converter capacity to a plurality of output loads without duplicating capacity.

Some preferred embodiments of interleaved inverters comprise a single substantially DC input power source such as a solar battery, a galvanic battery, or generator. Some preferred embodiments comprise more than one power source such as a solar battery and a galvanic battery. Some preferred loads comprise single or multi-phase power grids or microgrids.

As used herein, a master controller is a circuit that coordinates the system of converters. In some preferred embodiments, a master controller sets the switching frequency and phase for each converter. In some embodiments, a master controller provides a signal used to adjust the instantaneous current or power processed by converters.

Load Balancing

Load balancing is a crucial part of an interleaved converter design. Prior art interleaved converters comprise a system of a relatively small number of converters and duplicate substantial control and sensing circuitry in each converter to avoid imbalances. The present invention comprises feedback and control that avoids substantial duplication while balancing loads against the effects of component tolerances. Some embodiments of the present invention balance heat production. Some preferred embodiments minimize the circuitry that is duplicated in each converter and some minimize the complexity and cost of duplicated circuitry so that it can substantially implemented in an application-specific integrated circuit (ASIC).

Preventing Inductor Saturation

Some embodiments comprise a circuit to sense the magnetic field of an inductor. Some embodiments comprise one or a plurality of conductor loops around an inductor, some comprising a spiral, some employing multiple printed-circuit board layers. In some embodiments, the induced loop voltage or current is used in a converter feedback circuit to reduce a switch on-time.

Cooperative Soft-Switching

Having correlated switching allows an array of converters to perform for each other the role of auxiliary switch circuitry in prior-art soft-switched converters. In some preferred embodiments a master controller may change a switching frequency base to minimize switching stresses and losses. In some embodiments, a master controller senses a signal associated with switching stress or loss. In some embodiments a signal may comprise an audio- or radio-frequency (e.g., 10 kHz-10 GHz) emission or the intensity of an audio radio-frequency emission. Some embodiments comprise a conductor loop to facilitate detection. In some embodiments, a loop may comprise a wire. In some embodiments, a loop may comprise a printed circuit board trace. In some embodiments, such a loop may be routed to a plurality of specific areas to detect noise. Some embodiments employ multiple layers, spiral traces, and other techniques to increase sensitivity. In some embodiments, the loop may comprise a separate circuit, such as a sensing or power circuit. In some embodiments, the noise level on an analog sensing circuit may provide information about switching stresses so a master controller can minimize the effect. In some embodiments, a master controller changes the switching frequency to minimize a switching stress signal. In some embodiments, a plurality of feedback signals may be used by the master to find a maximum-efficiency operating point. Other such signals may comprise one or a plurality of temperature readings, measured output power or measured input-to-output efficiency, e.g., via analog sampling of currents and voltages.

Redundancy

An element of some embodiments of the present invention is the ability to operate despite the failure of one or more converters.

Converter Isolation

An element of some embodiments of the present invention comprises protection and isolation circuitry to ensure that failures in a converter channel do not produce cascading or secondary failures to circuitry outside the converter channel, e.g., circuitry of a master controller or other converter channels, etc. Isolation circuitry in some embodiments of the present invention ensure that a failed converter channel does not adversely affect operation of the interleaved converter except to remove that channel's power-processing capacity. In some embodiments, isolation is applied to one or more of: an input Voltage, a common Voltage reference/ground, an output Voltage, an analog control signal, a digital control signal, an analog sensing signal, a digital sensing signal, a power supply line, or the like. In some embodiments all power-bearing circuits are isolated after a failure. In some embodiments all power circuits except a ground reference circuit are isolated after a failure. In some embodiments, all analog and digital lines are isolated after a failure. In some embodiments all power-supply circuits are isolated after a failure.

Prior art isolators such as fuses generally provide isolation only to a circuit that has experienced an over current, possibly in combination with a crow-bar circuit that forces the over current in response to an otherwise detected fault. Such isolators act only on the circuit bearing the overcurrent.

Prior-art isolators such as contactors and circuit breakers provide isolation to a circuit or group of related circuits, e.g., two or three related AC phases, in response to current in a solenoid.

In some designs, it may be advantageous to trigger the opening of an isolator without requiring the stress of a radical over-current in a connection. Such an isolator, herein called a "triggered isolator" may then be controlled by a separate circuit, e.g., via Voltage or current in a trigger circuit. Isolation in some embodiments of triggered isolators may be controlled by a plurality of trigger signals. In some embodiments, one or more trigger signal may be based on a fault Voltage, current, power, or combinations thereof. In some embodiments, a trigger may be controlled by a digital or analog Voltage level. In some embodiments, the opening of an isolator by the action of one trigger may be indicated by a Voltage, logic state, current, resistance, short-circuit, etc. on an indicator line. In some embodiments, an indicator line may be shared with a trigger line, e.g., a digital line from a microcontroller that can both force an opening and detect an opening caused by a fault condition.

In some embodiments, a particular Voltage or logic-state sequence is required to trigger isolation. In some embodiments, this may prevent inadvertent activation of isolation.

Some embodiments of triggered isolators are of single activation, like a fuse, once triggered, they remain isolated until they are replaced. Some embodiments of triggered isolators comprise a single-use actuator that must be replaced like a fuse before the isolator can be re-engaged. Some embodiments of triggered isolators comprise multiple-use actuators that must be externally reset, like a circuit breaker, before re-engagement. Some embodiments of triggered isolators comprise automatically resettable multiple-use actuators, like a relay or latching relay.

Some embodiments of actuators comprise at least one element containing substantial potential energy. In some embodiments this element may comprise a flexed spring and the potential energy is mechanical in nature. In some embodiments, this element may comprise chemical or electro-chemical energy. In some embodiments, isolation actuation time and energy may be reduced by using a comparatively small power pulse to release this potential energy, e.g., by actuating or otherwise releasing a latch to release a spring, heat or spark-ignite an energetic chemical or mixture of chemicals. In some embodiments, a latch is released by melting or burning a mechanical object. In some embodiments a latch is released by a solenoid. Some embodiments further employ mechanical advantage such as leverage to reduce actuation force. Some embodiments employ vibratory motion to release a latch or repeatedly overcome a friction force, random or deterministic ratchet. Some embodiments employ one or more of thermal expansion, phase change, melting, sublimating, burning, hydraulics, pneumatics, vacuum, electromagnetism, light, induction, shock waves, shape-memory, magneto-, electro-, piezo-striction, dilation, or the like. Some embodiments employ one or more of an ultrasonic transducer, a piezoelectric element, a resistance heater, a laser, a pressure source, a vacuum source, a pump, a phase-change working fluid, a flexible membrane, or the like.

Some embodiments comprise a chain of potential energy release mechanisms to effect an energetic actuation from a modest actuation power.

Some embodiments draw some actuation power from an abundant source, e.g., an AC connection. Some embodiments comprise internal active circuitry comprising one or more of a switch, MOSFET, transistor, SCR, thyratron, diode, Zener diode, a crow-bar circuit, or the like.

In designs that achieve high reliability by redundancy, the need to isolate a plurality of different circuits necessitates a new kind of isolator, herein called a ganged isolator. A ganged isolator comprises a first isolator whose actuation causes the actuation or a second isolator via a coupling. In some embodiments, the coupling is one or more of mechanical, electrical, electromagnetic, optical, hydraulic, or pneumatic. In some embodiments, the coupling is momentary or transient.

Some embodiments of ganged isolators comprise a single assembly.

Some embodiments of ganged isolators comprise an actuator assembly that substantially provides the motive force or energy to achieve isolation and one or more substantially passive assemblies that contain at least one mechanically break-able circuit.

Some embodiments of isolators comprise one or more of: contacts that separate, conductors that break, conductors that are mechanically broken, conductors that are forced broken by excessive current through an auxiliary circuit, or bi-stable beams with contacts, bi-stable reed relays. Some embodiments comprise insulators that move during actuation to improve Voltage holdoff. Some embodiments comprise a contact immersed in a high-dielectric-strength liquid or gel. Some embodiments comprise an actuator containing potential energy that is released on actuation. Some embodiments comprise means of mechanical advantage so relatively high actuation forces and displacements can be triggered with low power. Some embodiments of isolators actuate based on one of: an analog control signal, a digital control signal, an overcurrent, an overvoltage, an overpower, or an overtemperature. Some embodiments actuate based on a plurality of triggers. Some embodiments of triggers directly actuate an isolator, e.g., an overcurrent melts a wire, which releases a spring, which in-turn opens at least one contact. Some embodiments of triggers indirectly actuate an isolator, e.g., a digital signal may close a semiconductor switch, which acts as a crow-bar which drives a high current through a fused wire or solenoid to actuate motion. Some embodiments of potential energy contained in an actuator comprise mechanical strain energy, chemical energy, or electrochemical potential energy. Some embodiments of triggers employ a code sequence for activation. Some embodiments of isolators are single-use. Some are manually resettable, some are automatically resettable, some require the replacement of an actuator component to return to service.

In some embodiments of the present invention the master controller detects failure or impending failure of a channel. In some embodiments, this detection involves one or more of: perturbing the clock-pulse sent to a channel under scrutiny, sensing an analog signal from the channel under scrutiny, sensing an analog signal from a power source, sensing an analog signal from an output load, sensing a digital signal from the channel under scrutiny, sensing switching noise and correlating noise timing with switch timing to identify an anomalous channel.

The lifespan of cost-effective capacitors is short enough at high temperature to demand attention, particularly when an interleaved converter according to the present invention is used as a single-phase solar power inverter, since the source does not have internal storage and the load demands cyclic power. Some embodiments of master controllers according to the present invention monitor the health of a capacitor by observing its capacitance over time. In some embodiments, a master observes an input voltage change during a load-power excursion, such as one or more AC power cycles or other master-controller induced or observed power modulation. In some embodiments, a master infers a capacitance metric from this voltage change. In some embodiments, additional sensor information may be used, such as temperature measurements and temperature history. In some embodiments, when the capacitance metric changes sufficiently from a baseline value, the master controller may take self-protection steps, such as de-rating and alerting owners, operators, or installers to change a capacitor module.

In some embodiments of the present invention, the master controller adjusts the clock phases so that the phases applied to each functioning converter are spread substantially evenly over the timing cycle. In some embodiments, a master controller may intentionally perturb the clocking of a channel to probe its performance, state of health, calibration, etc. Some embodiments comprise a circuit, herein called an "Interleaver" that sequences clock pulses to channels based on a clock input, internally generated clock, or internal timing multivibrator.

DETAILED DESCRIPTION

Figure 1:
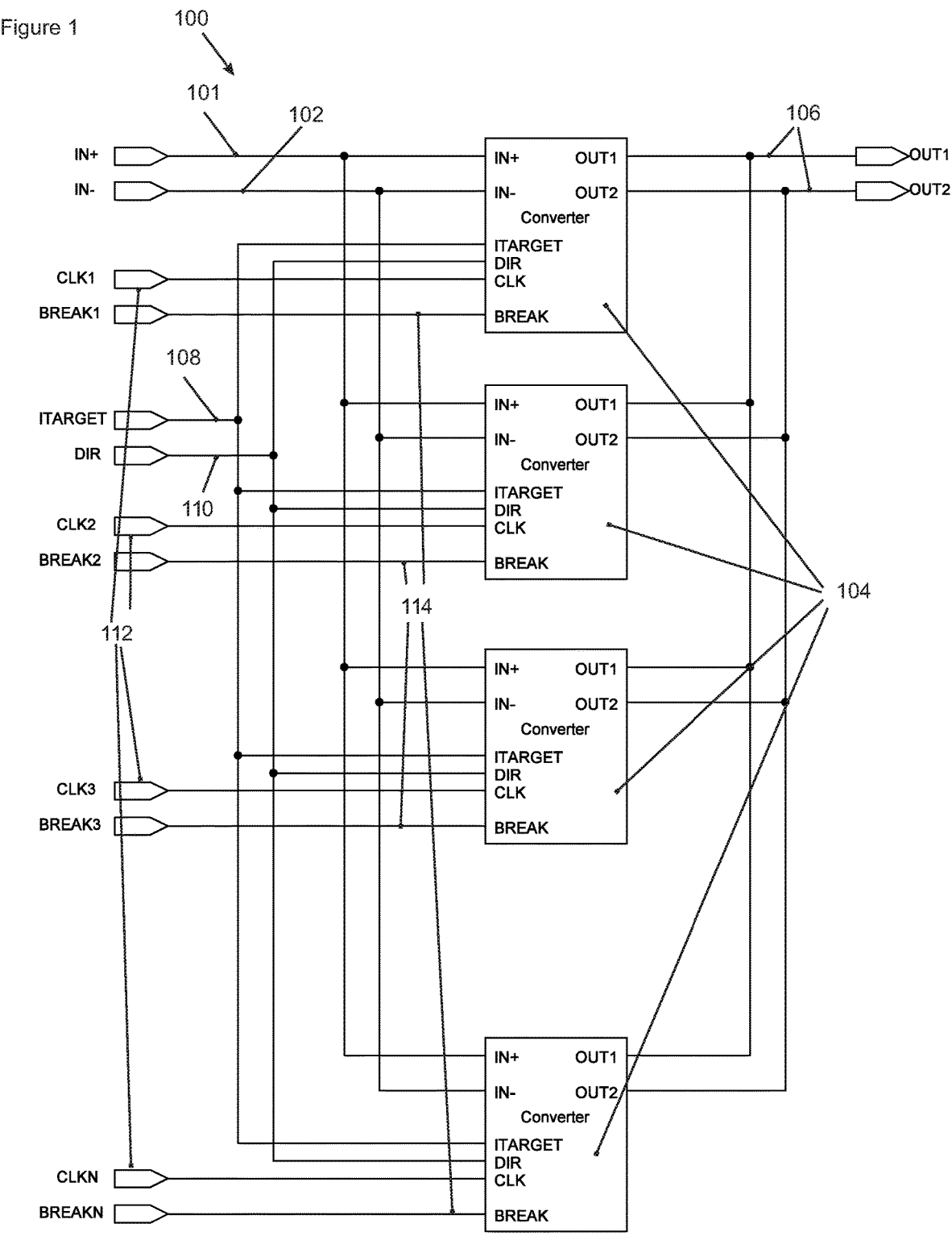
FIG. 1 shows a block diagram of interleaved converter channels according to an embodiment of the present invention.

FIG. 1 shows a block diagram 100 of interleaved converter channels according to an embodiment of the present invention. Elements 101 and 102 are respectively the positive and negative common inputs to a plurality of converters channels 104. Element 106 is a common output of the converter array. Element 108 is a common analog signal that sets a common target operating condition, e.g., an average current, power, Voltage, or combination thereof for each converter. Some embodiments further comprise element 110, a common binary signal that sets a common converter direction e.g., for current flow, especially if the output is alternating current. Elements 112 are individual time-staggered clock signals that force the converter switching to be temporally interleaved. Some embodiments further comprise individual signals (114) that force a converter channel to open at least one circuit. In some preferred embodiments, a converter channel opens a plurality of circuits based on this signal. In some embodiments, this opening of circuits allows the interleaved converters to continue or later resume normal operation despite a failure in a converter channel. In some embodiments, this signal may indicate a fault on the channel. Some embodiments may comprise one or more additional signals to indicate fault condition. In addition to these signals, converter channels may share one or more common power supplies and ground.

Figure 2:
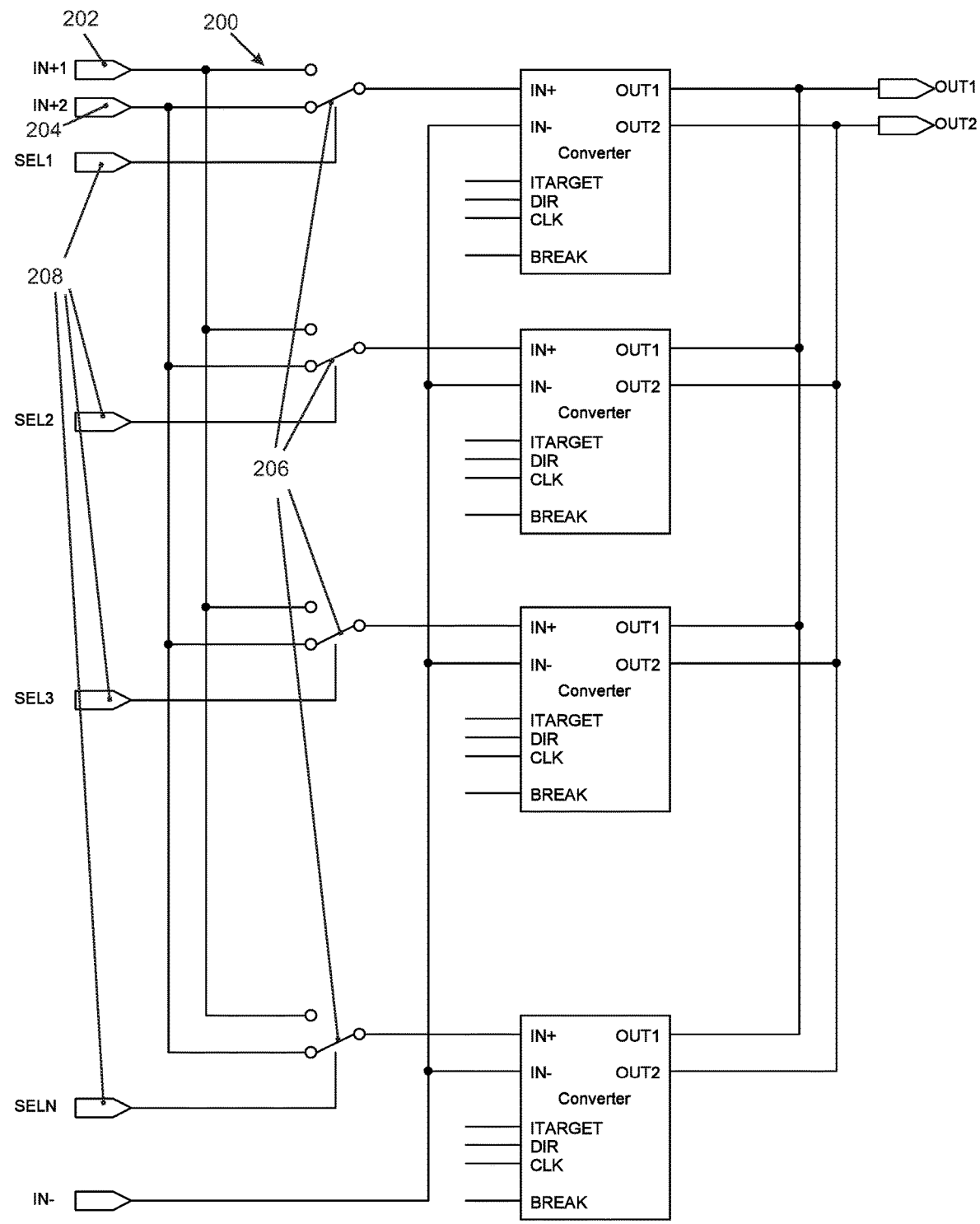
FIG. 2 shows a block diagram of an alternative array of interleaved converter channels according to an embodiment of the present invention.

FIG. 2 shows a block diagram 200 of an alternative array of interleaved converter channels according to an embodiment of the present invention. For clarity, the control signals of FIG. 1 are not shown. This embodiment comprises a plurality of power inputs 202 and 204, and a plurality of switches 206 that select between power sources. In some embodiments, these switches are individually controlled by signals 208. In such an embodiment, the converter channels can be dynamically switched to draw power from a plurality of sources. In some embodiments sources may comprise a solar array, battery, rectified grid power, generator, etc. to provide power to a load, e.g., a battery charger, inverter, or end-use. Such an embodiment may avoid an unnecessary duplication of power circuitry. In some embodiments, one or more control signals, e.g., an analog operating point signal, may be switched in tandem with the input source selector.

In some embodiments, an alternative array of interleaved converters may drive power to a plurality of loads via individual selector switches and selector switch control signals. For example, an interleaved converter array may drive both grid power and a battery charger or battery or a load such as a pump, refrigerator, electrochemical reactor, etc. In some embodiments, converter channels may be dynamically allocated to a plurality of loads. In some embodiments, this dynamic allocation is performed in response to load demand. For example, an interleaved converter may dynamically allocate converter channels to provide power to storage or a non-critical load when more power is available than is needed by a prioritized load and to provide more power to a prioritized load when needed.

Figure 3A:
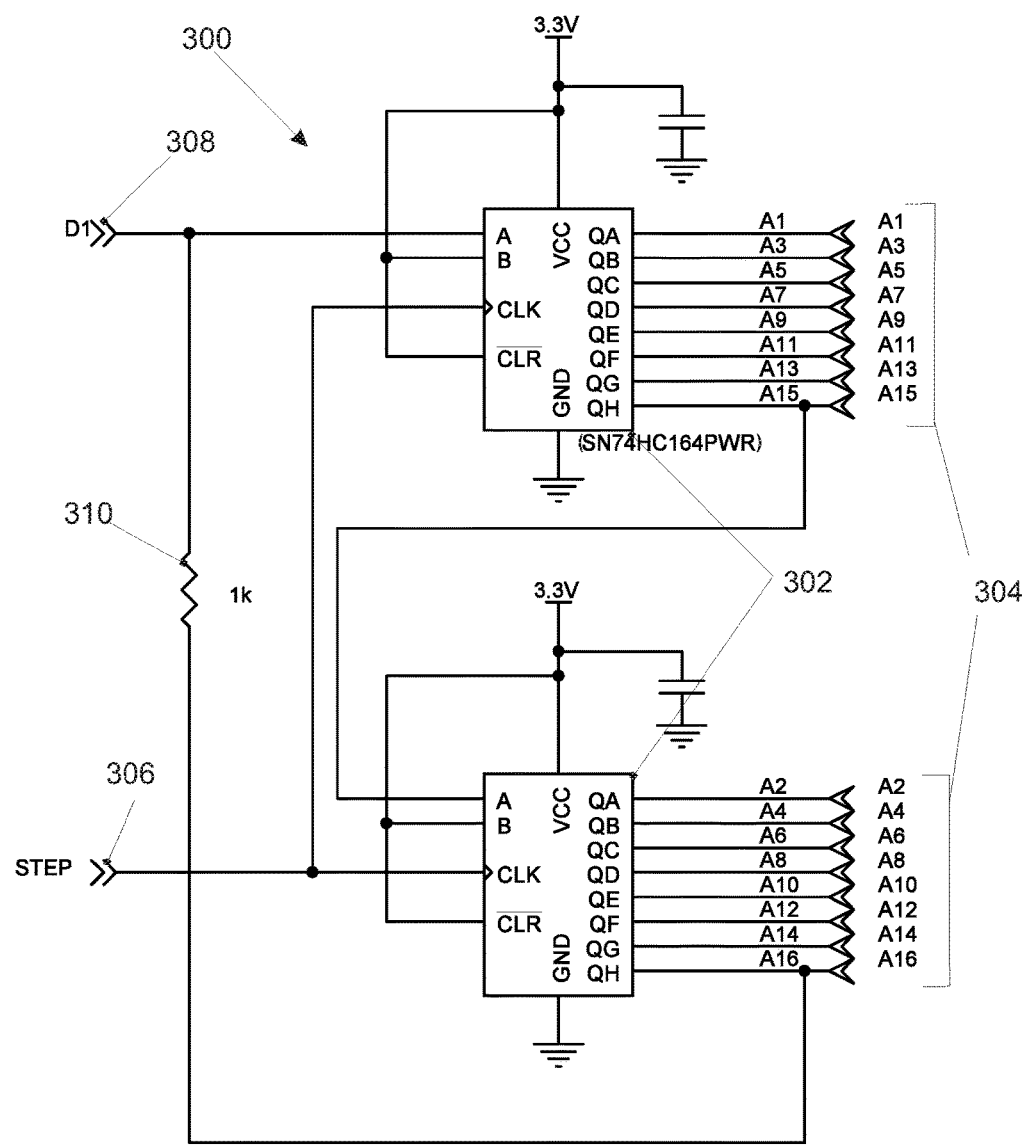
FIG. 3A shows an interleaver according to an embodiment of the present invention.

FIG. 3A shows an interleaver (300) according to an embodiment of the present invention. In this embodiment one or more shift-registers 302 are used to produce a binary waveform that advances sequentially in time down the array of outputs 304 on every clock 306. While the block diagram of a 74HC164-type shift register is shown, alternative shift registers may be used as known in the art. Signal 308 may be used to preload a desired waveform into the shift registers by setting driving 308 to a desired state as 306 is clocked. When the full waveform has shifted in, signal 308 may be tri-stated (high-impedance) and in some embodiments used to monitor the waveform progression. Coupler 310, which may be a resistor or a tri-state register or other connection known in the art allows the last clock pulse to feed back to the first pulse so that once programmed, the sequence repeats cyclically. In some embodiments, the shift register is preloaded internally with a waveform. This arrangement provides time-staggered pulses to a fixed number of channels. The staggered labeling of adjacent clock pulses, e.g., Q1, Q3, . . . , Q15, Q2, Q4, . . . , Q6 is intended so that $Q_n$ and $Q_{n+1}$ are 180 degrees out of phase with each other in the cycle.

Figure 3B:
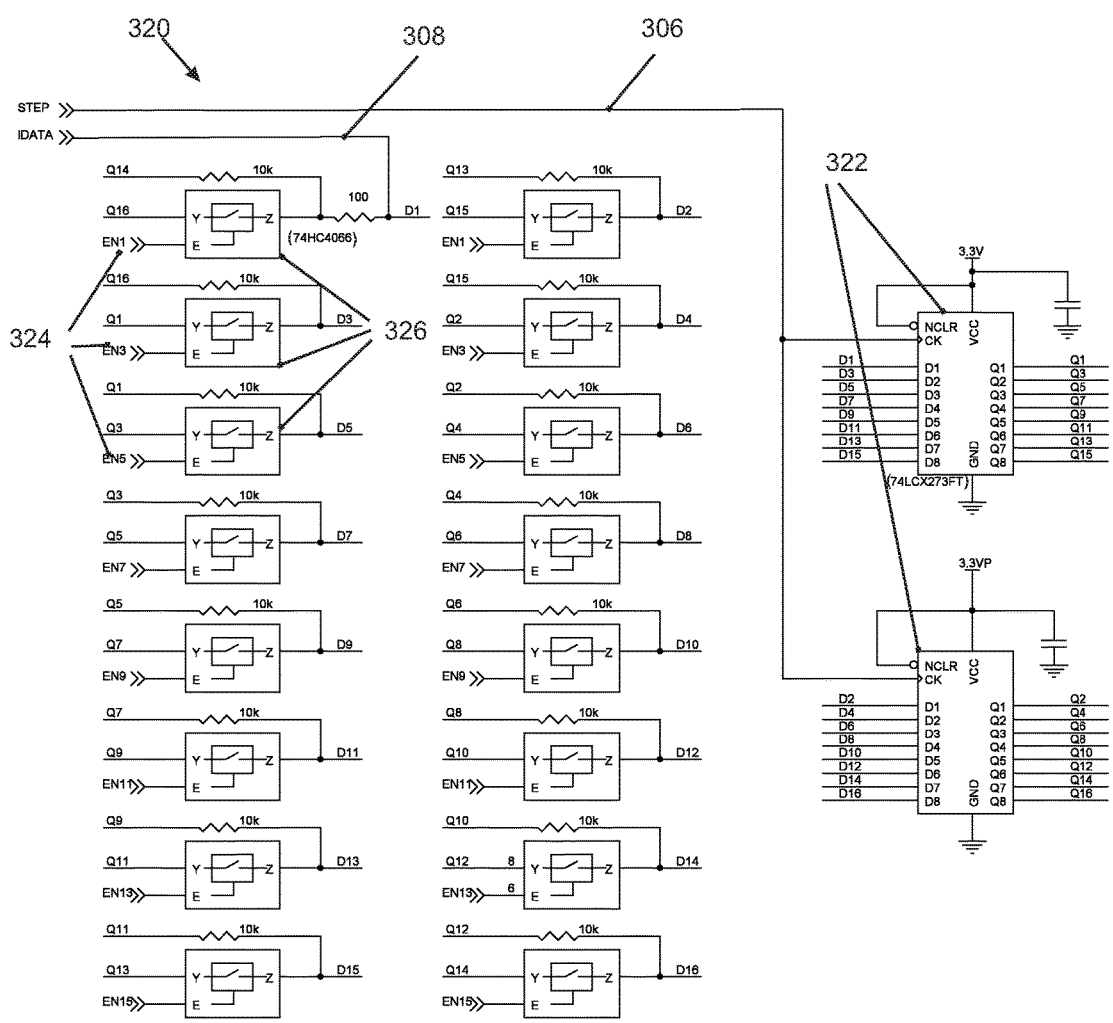
FIGS. 3B and 3C show interleavers that supports a variable number of channels according to some embodiments of the present invention.
Figure 3C:
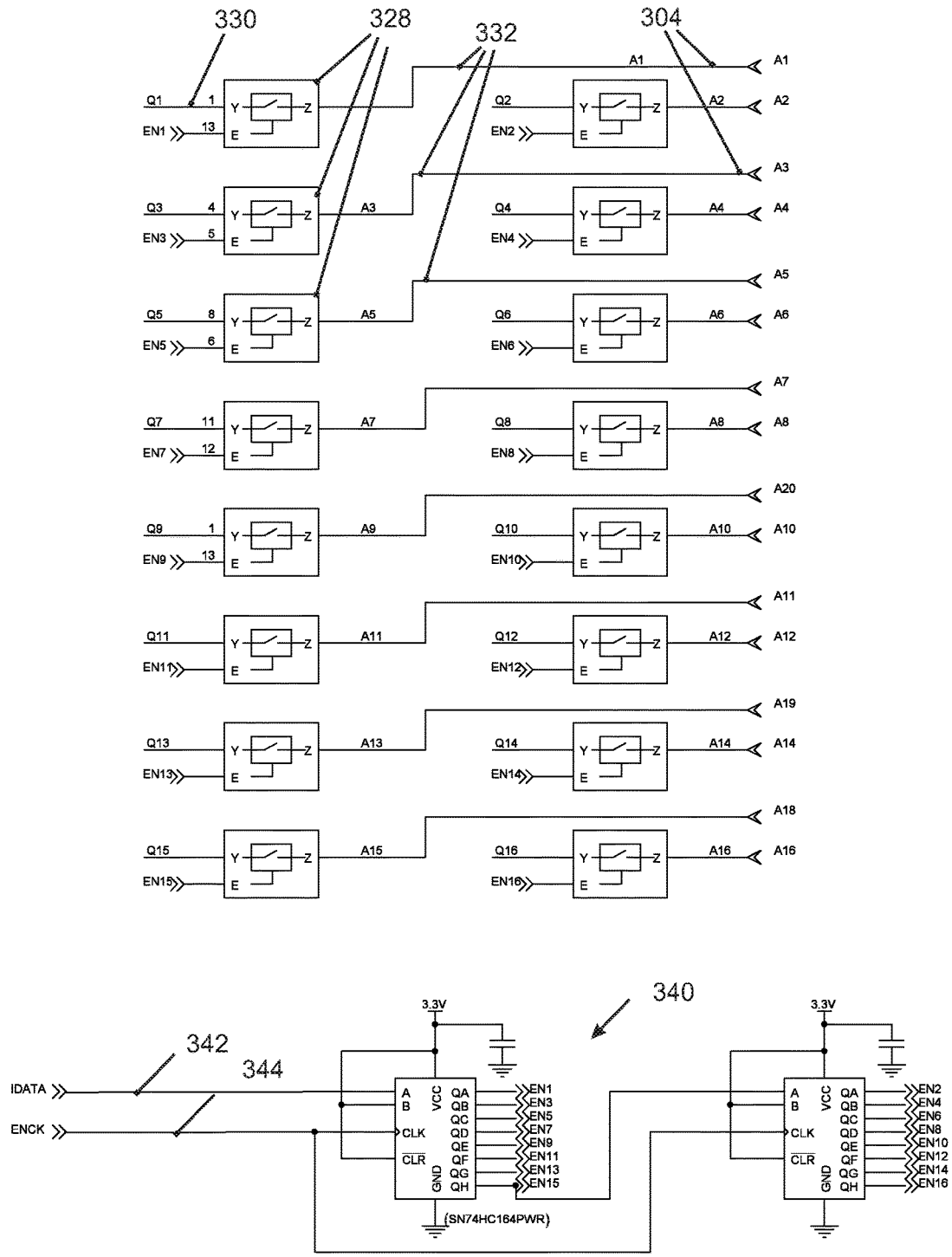

FIGS. 3B and 3C show an embodiment of an interleaver (320) that supports a variable number of channels. This embodiment employs non-transparent latch arrays 322. In this example, the latches are 74LC273 integrated circuits but other latches can be used as known in the art. A plurality of individual binary 'enable' signals 324 each drive an analog switch (326), tri-state circuit, or equivalent. When the nth enable signal is high, the n+2's latch input is fed by the nth latch output. Then the enable signal is low, it is driven by the n−2's latch output, with n wrapping cyclically from 1 to 16. In this arrangement, the latch outputs of all enabled channels have waveforms that are staggered by only one step clock pulse (306) period regardless of the number or arrangement of disable channels.

Some embodiments of interleavers according to the present invention further comprise a plurality of analog switches (328), tri-state circuits, or other circuits known in the art to prevent latch outputs (330) from being passed to the channel clock outputs (304), e.g., as shown in FIG. 3C.

Some embodiments further comprise a shift register circuit e.g., 340, shown in FIG. 3C, to produce individual enable signals (324) from a single data source (342), which may be time shared with another signal, e.g., 308, and clock signal (344).

Figure 3D:
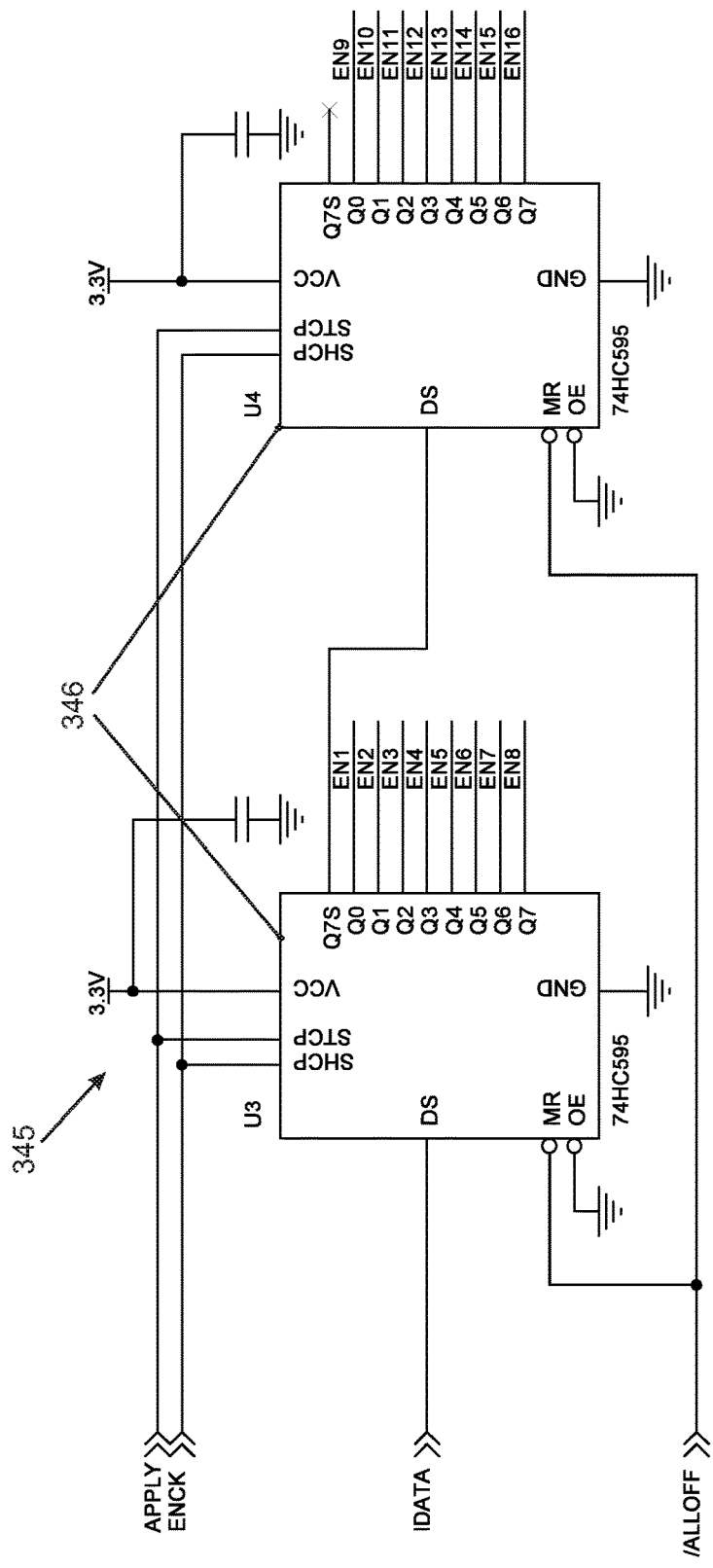
FIG. 3D shows an alternative circuit for producing enable signals according to an embodiment of the present invention.

FIG. 3D shows an alternative circuit 354 to circuit 340 for producing enable signals. This alternative circuit employs an internal register and latch to avoid spurious enable signals during the shift operation. Other embodiments that achieve the same desired end are known in the art. This interleaver circuit is low in gate count and a good candidate for integration into an inexpensive ASIC.

Figure 3E:
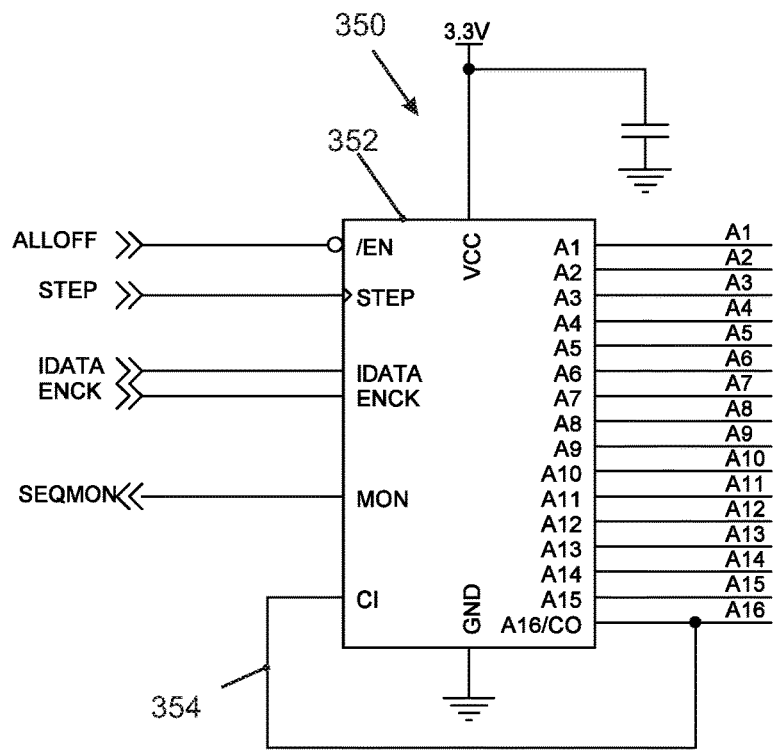
FIGS. 3E and 3F show block diagrams of interleaver ASICs according to some embodiments of the present invention.

FIG. 3E shows a block diagram 350 of an interleaver ASIC 352 according to an embodiment of the present invention comprising the circuitry in FIG. 3B. The connection 354 may alternatively be used to daisy-chain a plurality of ASICs.

Figure 3F:
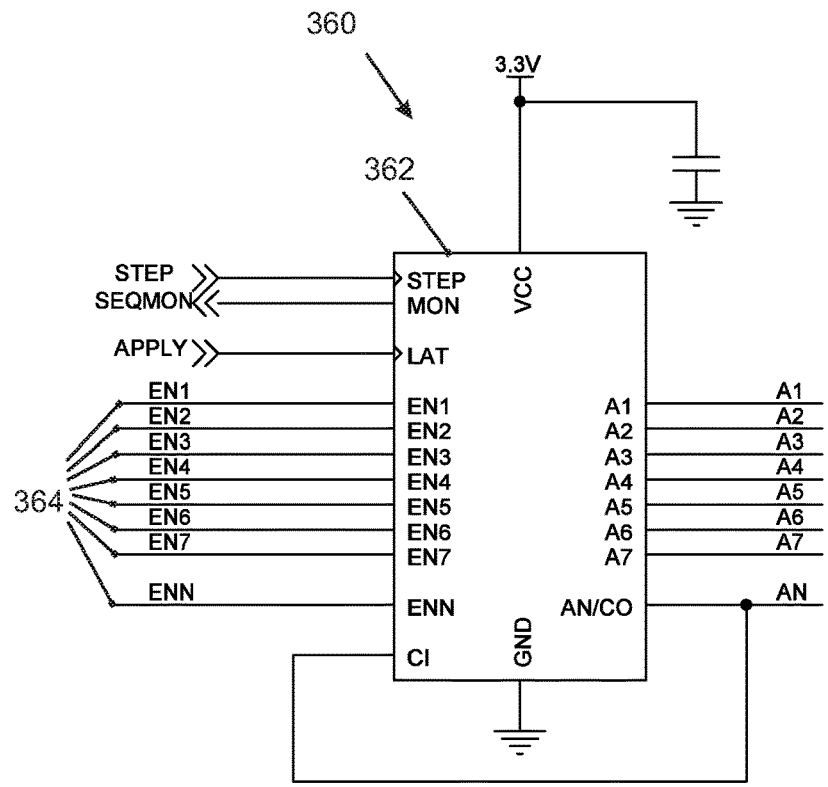

FIG. 3F shows a block diagram 360 of an interleaver ASIC 362 according to an embodiment of the present invention with individual enable pins instead of the serially loaded enable register. In some embodiments, a controller may periodically evaluate the state of health of a converter channel by disabling and enabling it while monitoring the resulting change in processed power. Some embodiments may further spread the spectrum of the switching by periodically enabling or disabling one or more channels. Such an arrangement may simplify these procedures.

Figure 4A:
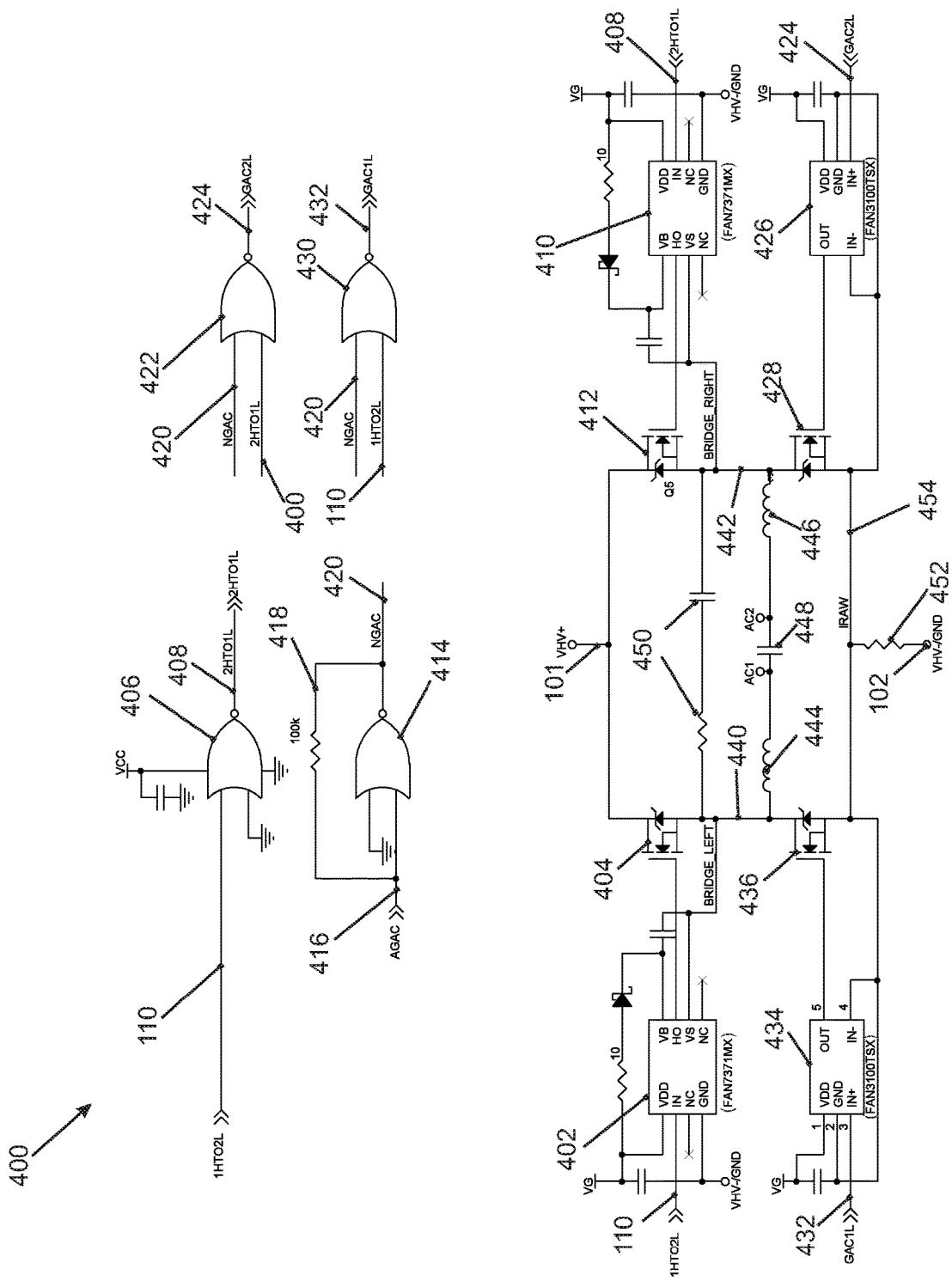
FIG. 4A shows a schematic diagram of an embodiment of the drive logic and power electronics of a converter channel according to an embodiment of the present invention.

FIG. 4A shows a schematic diagram 400 of an embodiment of the drive logic and power electronics of a converter channel (104). The direction signal (110) of FIG. 1 feeds the control input of a high-side gate driver 402 that drives the gate of high-side switch 404. This embodiment shows a FAN7371 device operated in bootstrap mode. Other embodiments may use a different gate driver, optoisolator, or photovoltaic gate driver circuit as known in the art. Other embodiments may alternatively or additionally use a separate isolated power supply to maintain the gate voltage over a half-cycle AC period. Some embodiments employ a rectified capacitively coupled high-frequency waveform to supply power to the gate drive. Some embodiments employ a full-rectified signal from substantially complementary waveforms to supply power to the gate drive. Some embodiments feed the gate In this embodiment, signal 110 also feeds inverting gate 406, generating a complementary signal 408 used to feed the control input of high-side gate driver 410, which controls high-side switch 412.

In this embodiment, inverting gate 414 acts as an inverting comparator for an analog control signal 416. Some embodiments bias this gate with a feedback element 418 as known in the art. In this embodiment, the resulting high-frequency digital switch signal 420 is gated by complement of the direction signal 408 by gate 422 and the resulting gated switch signal 424 is used to feed the control input of a low-side gate driver 426, for example a FAN3100 or other gate driver as known in the art. Driver 426 controls 428, the right-side low-side switch.

In this embodiment, the direction signal 110 gates the high-frequency switch signal 420 in gate 430 to produce the control signal 432 for the other low-side gate driver 434 that drives low-side switch 436. This arrangement ensures that the bridge comprising switches 404, 412, 428, and 436 are switched so that the sign of the Voltage applied from 440 to 442 is controlled by the single direction signal. Some embodiments further comprise circuitry to time-skew switch transitions to avoid the possibility of shoot-through as known in the art.

Elements 444 and 446 are filter inductors. In some preferred embodiments these inductors have substantially the same inductance. Some embodiments further employ filter capacitor 448. Some embodiments further employ a "snubber circuit," e.g., 450 as known in the art. Prior art converters may generally employ a single filter inductor, however, the twin inductors 444 and 446 provide isolation between converter channels.

Element 452 is a current sensing resistor that produces current sense signal 454. Alternative embodiments may comprise a transformer, Hall-effect sensor, printed-circuit board trace, coupled printed circuit board traces or other technique of inferring current as known in the art. In some preferred embodiments, this current measurement is substantially sensitive only to the current flowing through its associated converter channel, and substantially insensitive to currents produced by other converter channels.

Figure 4B:
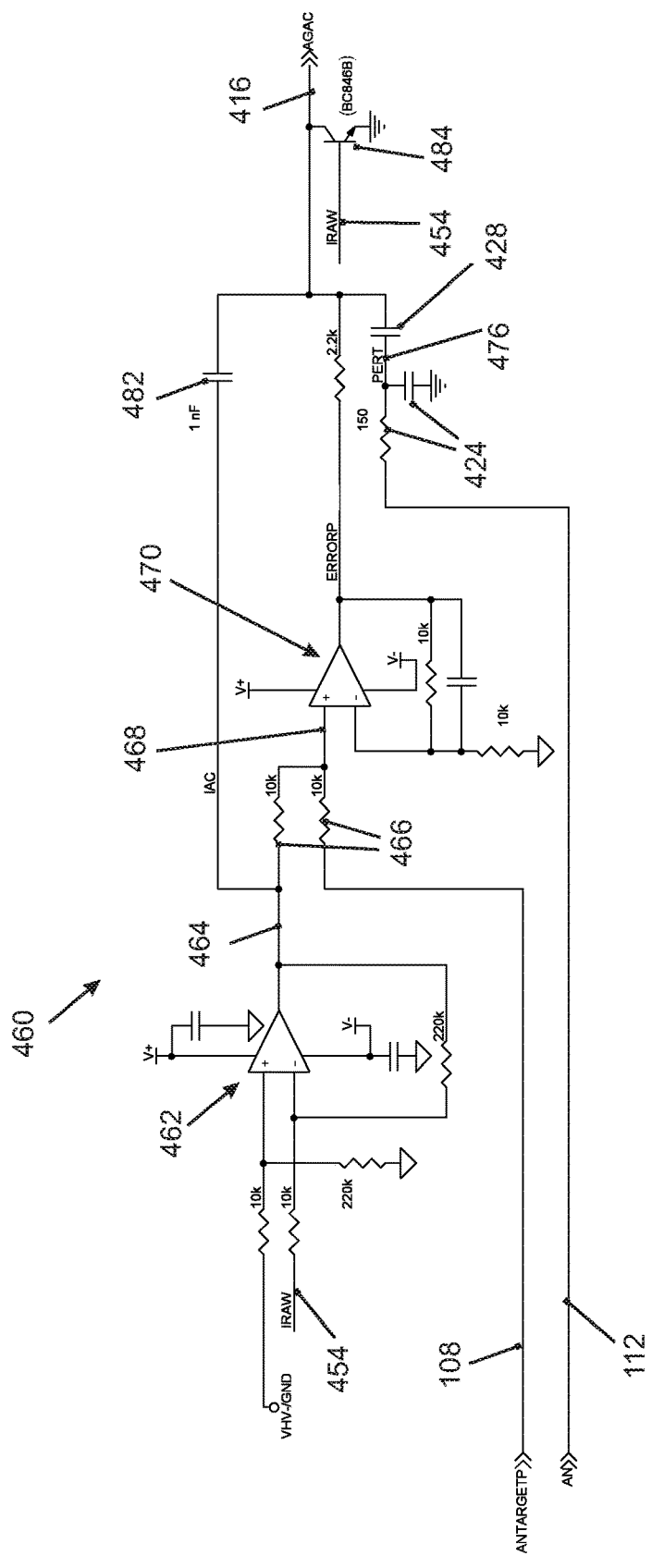
FIG. 4B shows an embodiment of a feedback circuit used to produce an analog switch signal according to an embodiment of the present invention.

FIG. 4B shows an embodiment of a feedback circuit 460 used to produce analog switch signal 416. The function of this circuit is to combine the common analog control Voltage 108 with the channel-specific clock pulse 112. The simplest implementation of such a control circuit would be a resistive combiner of the two signals. An alternative implementation would comprise a buffer amplifier to provide isolation between the clock signal and analog control signal. The embodiment 460 amplifies the channel-specific current signal 454 using sub-circuit 462, in this embodiment an inverting differential gain amplifier, to produce a signal 464 that is substantially proportional to the negative of the converter-channel input current. This signal is resistively summed with the target signal using resistors 466 to produce a current error signal 468. Sub-circuit 470 buffers and low-pass filters this input into signal 472.

Element 474 differentiates the clock signal 112 into a saw-tooth waveform 476. Sawtooth clock waveform 476, current error signal 472, and instantaneous current signal 464 are combined by elements 478, 480, and 482 respectively into the analog switch control signal 416. The signal coupled by 482 may act substantially as a derivative signal.

Element 484 may be used as an over-current protection circuit that forces the analog control Voltage low if the current-sense signal is above ~0.6 V. Alternative over-current protection embodiments may employ gain on the current signal. Some embodiments may employ digital gating of one or more signals to turn of switching in the event of an over current. Some embodiments may communicate the triggering of an over-current protection circuit to a digital device such as a logic gate or microcontroller.

In some embodiments the circuitry 460 and 400 are ground-referenced to an input Voltage, e.g., 102.

In some embodiments, a feedback signal is derived from an output-current measurement. In some embodiments an inductor-current signal is measured via a secondary winding. In some embodiments the secondary winding may comprise one or a plurality of printed-circuit-board traces or spirals disposed to encircle one or both inductors 444 and 446. In some embodiments an inductor is mounted so its body passes through a hole in a printed circuit board. In some embodiments, this hole is encircled by a printed circuit board trace so that changes in the inductor's magnetic field induce a current or voltage in the circuit board trace. In some embodiments, this signal may be combined in an embodiment of the feedback circuitry 460. In some embodiments, this signal may be used to detect saturation of an inductor core. In some embodiments, the inductor-current signal provides negative feedback so that inductor saturation and associated run-away effects are avoided. Some such detection may be based in part on one or more of: the rate of rise of a signal, the magnitude of a signal.

Some embodiments may employ a temperature-sensitive signal as a negative feedback signal. In some embodiments such feedback may be used to prevent over temperature operation. In some embodiments, this feedback may be used to ensure that loads are borne substantially evenly by converter channels. In some embodiments, a temperature signal is derived from a junction voltage. In some embodiments, a temperature signal is derived from a thermistor.

Some embodiments comprise a six-switch bridge to drive power to a three-phase AC load.

Figure 5A:
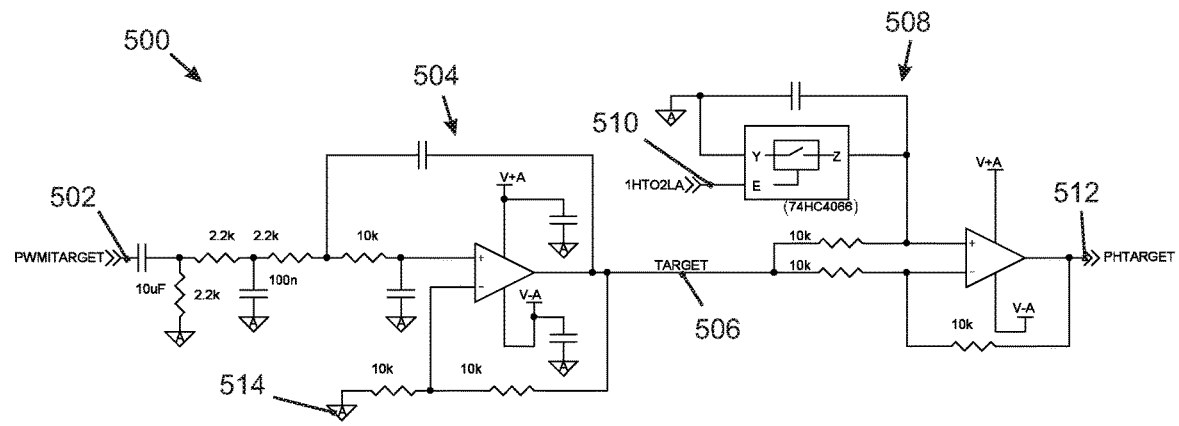
FIGS. 5A through 5D show the sub-circuitry used to produce the common channel control signals in some embodiments of the present invention.

FIGS. 5A through 5D show the sub-circuitry used to produce the common channel control signals in some embodiments of the present invention. In FIG. 5A, the sub-circuit 500 converts a microcontroller-produced pulse-width modulated (PWMed) signal 502 into an analog "target signal" 506 using an active low-pass filter 504. In some embodiments this signal is converted to a rectified waveform 512 by sub-circuit 508, which switches the gain between +1 and −1 depending on the control signal 510. In some embodiments, the ground reference 514 for this circuitry is substantially common with a power output voltage. In some alternative embodiments, the ground reference is substantially common with an input voltage.

The low-pass filter 504 produces a substantial phase delay. In some embodiments, a microcontroller compensates for this delay by advancing its PWM waveform from detected zero crossing times by a judiciously chosen time. In some embodiments, this judicious advance time includes an extra positive or negative delay value. Such an extra delay may facilitate the generation of reactive power. In some cases, the PWM waveform is dynamically adjusted by scaling the duty cycles. In some embodiments this scaling adjusts the magnitude of the supplied power. In some embodiments, a microcontroller may produce a sequence of PWM duty cycles that comprise a discretely approximated offset sinusoidal function. In some embodiments, a microcontroller may augment or modify sequence of PWM duty cycles to effect a desired outcome, for example to correct a power factor, to remove a detected Voltage defect, etc. Some embodiments produce signal 506 from a resistively divided load Voltage waveform. Some embodiments further scale the resistively divided load Voltage waveform to modulate or adjust output power.

Figure 5B:
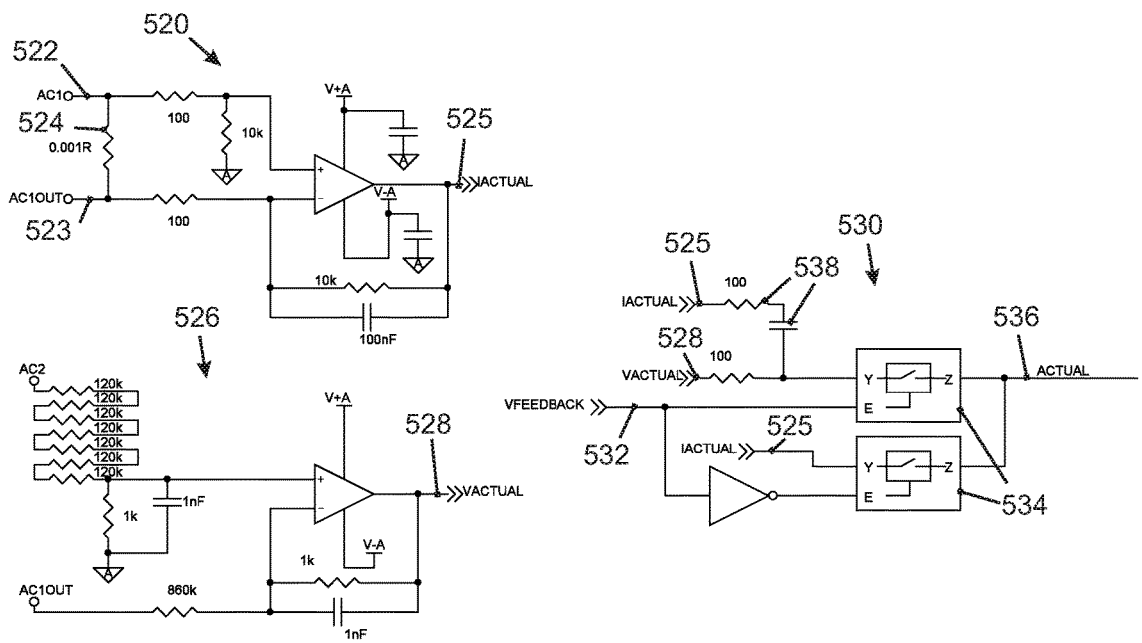

FIG. 5B shows an embodiment of an output sensing sub circuit comprising a current sensor 520, a Voltage sensor 526, and a feedback signal selector 530. In some embodiments, the sensing circuitry is substantially common with an output voltage. In some embodiments, the sensing circuitry is substantially common with an input Voltage. An advantage of referencing to an output Voltage may be to avoid large common-mode Voltage swings.

Sub-circuit 520 produces a signal 525 that is proportional to the total output current produced by all the channels by amplifying the Voltage drop across a current sensing resistor 524 between an internal output Voltage 522 and external output Voltage 523. Some embodiments detect the output current using a transformer, Hall effect sensor, or other technique known in the art to produce signal 525. Some alternative embodiments produce a signal by summing the current-sensing signals from a plurality of converter channels. An advantage of using a separate current-sensing circuit may include a relaxation of calibration requirements.

A further advantage may be the ability to calculate the power supplied to the output. This may allow an inverter to optimize its operation to deliver the maximum output power, which may be useful in optimizing conversion efficiency.

Sub-circuit 526 comprises a resistive Voltage divider and buffer to produce an output-Voltage-proportional signal 528.

In some embodiments, sub-circuit 530 uses analog switches 534 to switch the sensed feedback signal 536 between the measured current 525 and measured Voltage 528 according to a control input 532. Some embodiments combine Voltage and current feedback, e.g., via a coupling circuit 538.

Figure 5C:
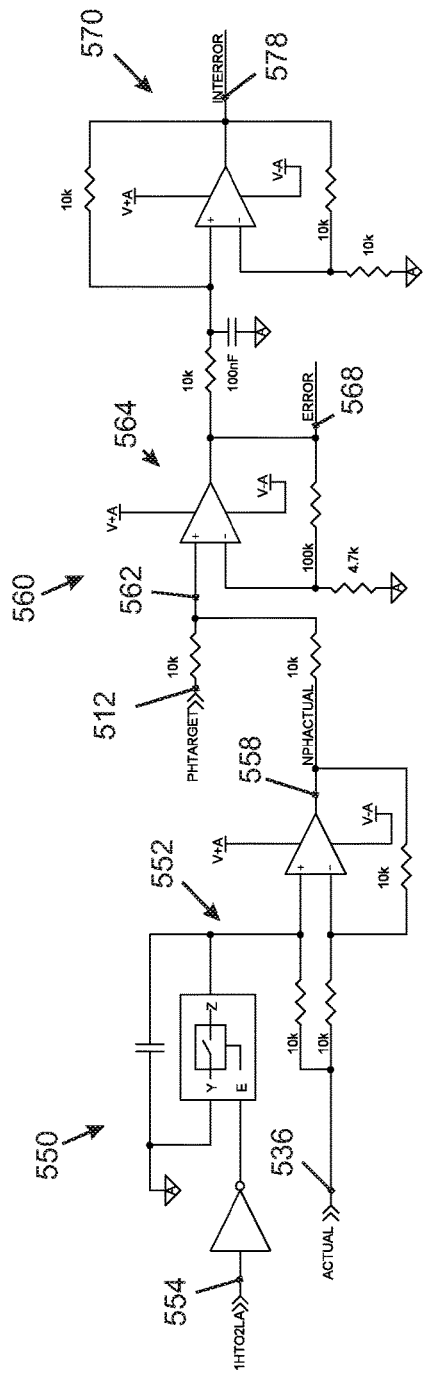

FIG. 5C shows sub-circuits 550, 560, and 570 that produce error (568) and integrated error (578) signals. Sub-circuit 550 negatively rectifies the sensed output waveform 536 to waveform 558 using an amplifier that switches between +1 and −1 gain 552 based on a digital "direction" signal 554.

The sum 562 of the negatively rectified sensed waveform 558 and positively rectified target signal 512 is amplified by 564 to produce the error signal 568.

Sub-circuit 570 integrates the error signal into signal 578 for use in a proportional, derivative, and integral (PID) feedback loop as known in the art.

Figure 5D:
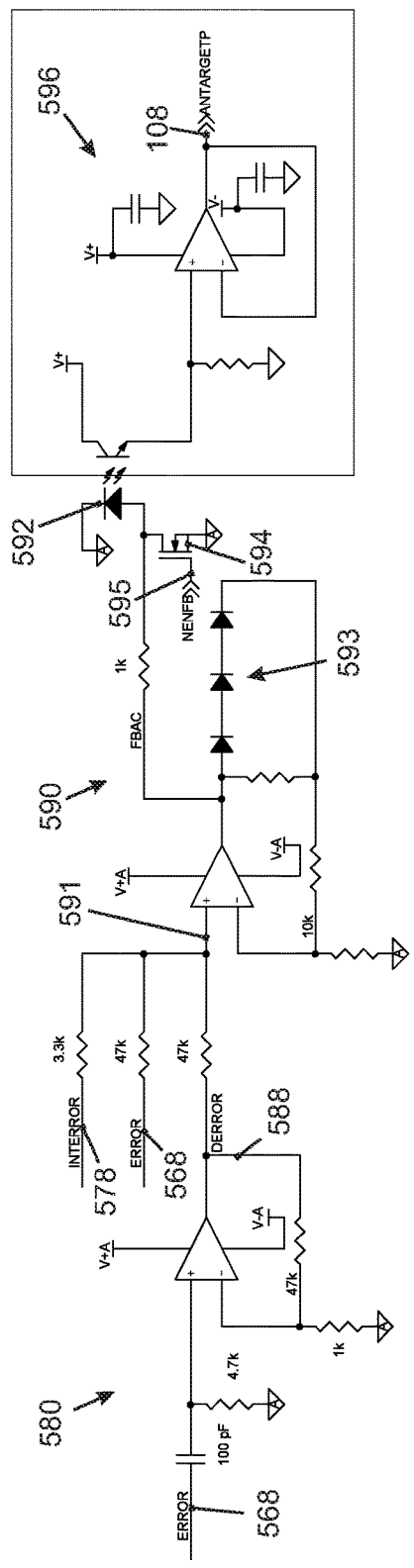

FIG. 5D shows an embodiment of sub-circuits 580, 590, and 596 that produce the common analog target waveform 108. Sub-circuit 580 produces a time-differentiated error signal 588.

Sub-circuit 591 sums the proportional (568), integral (578), and derivative (588) error waveforms at node 591, and drives current through the light source of an optocoupler 592 with a current related to the Voltage at node 591. In some embodiments, feedback circuitry 593 may be used to linearize partially the relationship between the Voltage 591 and current through 592. Some embodiments comprise a switch 594 and gate signal 595 or other equivalent circuit known in the art that can force the isolator LED off. In some embodiments, the sub-circuit 596 amplifies the phototransistor voltage to produce the common control signal 108 referenced to the input power.

In some alternative embodiments, some or all of the sensing circuitry is referenced to input power. In some embodiments the change in ground reference is accomplished by a technique other than an opto-isolator, such as a radio-frequency-modulated and demodulated circuit, voltage or current mirror or other technique known in the art. Some embodiments comprise fewer feedback signals, e.g., without one or more of a proportional, derivative, or integral signal. Some embodiments comprise more feedback signals, including, but not limited to one or more of the following signals, their derivatives and integrals of all orders: a temperature signal, an input Voltage signal, an input Voltage change signal, an efficiency measurement, a power signal, a tertiary signal unrelated to input and output.

As shown by FIGS. 4 and 5, some embodiments of the present invention comprise a nested feedback loop: an inner loop that enforces interleaved timing, compensates for converter channel component tolerances, etc., and an outer feedback loop common to all channels that ensures the total output waveform matches a desired profile, e.g., a sinusoidal profile.

The circuit architectures in FIGS. 4 and 5 are designed to work with low cost, low-speed op-amps. In the inner feedback loop, (FIG. 4) the fast-switching edge is produced by differentiating the digital clock pulse train. This high-frequency saw tooth wave is superimposed on a lower-speed waveform produced by the op-amps in the feedback loop. These feedback loops work even for op amps with gain bandwidth products below of 200 kHz. The high-speed comparator function to produce the switching waveform is provided by an inexpensive digital logic gate.

Much of the circuit in FIG. 4 is designed to be implemented cost effectively in an ASIC with only a few discrete components.

Figure 6A:
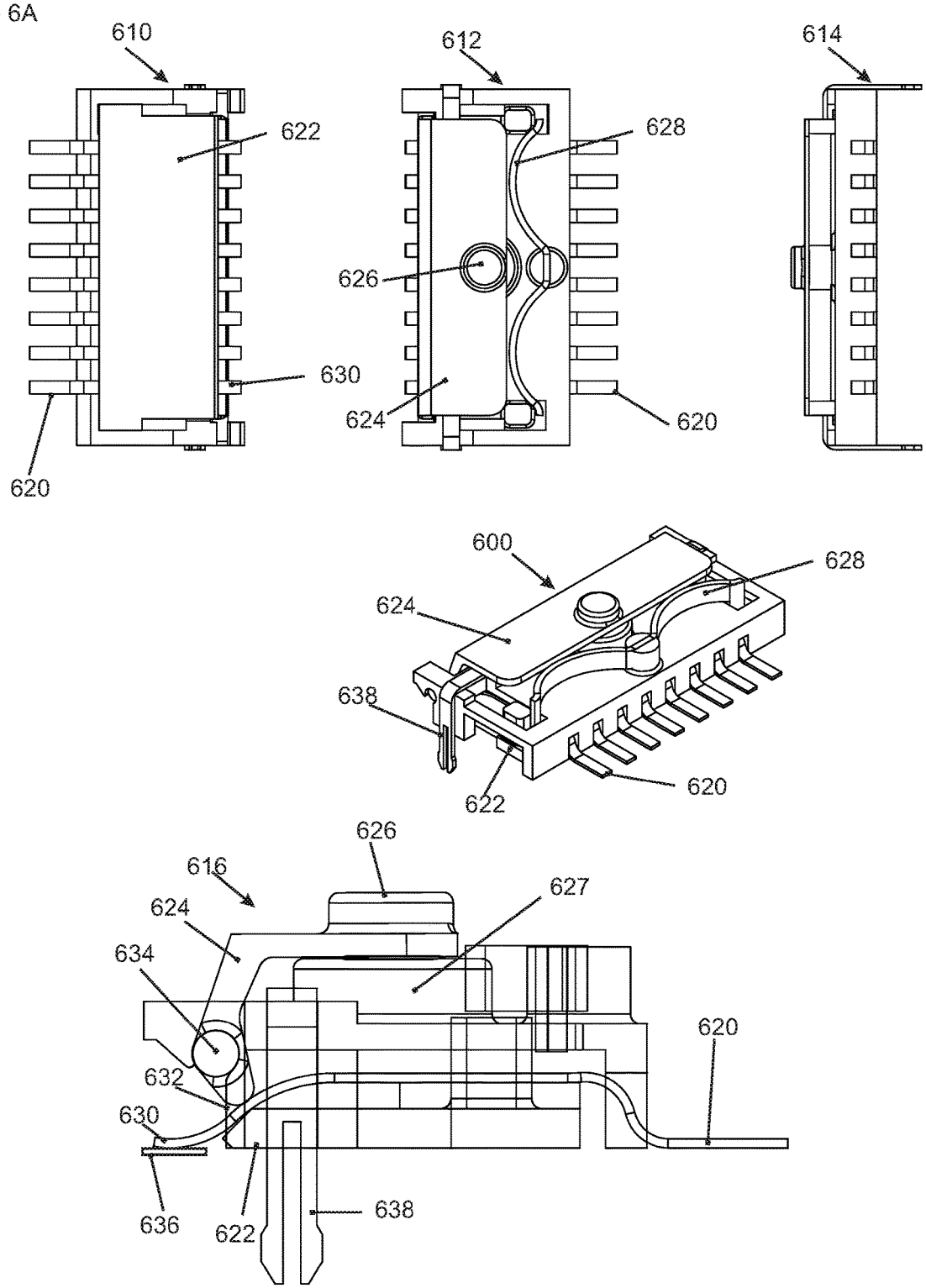
FIGS. 6A and 6B shows bottom, top, back, and end views of ganged isolators according to some embodiments of the present invention.

FIG. 6A shows views 610 (bottom), 612 (top), 614 (back), and 616 (end-on, no-hidden lines) of an embodiment of a ganged isolator 600 in its non-isolated configuration. Element 620 is one of a plurality of electrical conductors, e.g., a copper, bronze, brass, phosphor bronze, with or without passivating coatings or coatings for enhanced conductivity, or solderability e.g., gold, nickel, tin, lead, as known in the art. Element 622 is an insulating slide. Element 624 is a lever having a pivot axis 634.

View 616 shows the cam 632 of lever 624 pressing against a conductor 620 such that the electrode makes contact at 630 with a printed circuit board pad 636. In some alternative embodiments, the counter contact may be integrated in the ganged isolator.

In some embodiments, the force exerted by the lever, e.g., by cam 632 also restrains motion of insulator 622 against a spring preload, e.g., from spring 628.

Elements 626 and 627 comprise a level actuator, as described above. In some embodiments, this actuator may comprise a permanent magnet, a second permanent magnet or magnetizable material, and a solenoid. In some embodiments, the lever is held passively in place magnetically and released by impulsively driving a solenoid such that the magnetic force becomes repulsive. In some embodiments, an actuator produces an impulsive force to pivot lever 624 when isolation is triggered.

Some embodiments comprise a mechanically sturdy anchor, e.g., 638, in part to maintain a substantial electrode preload between the conductors and circuit-board pad. In some embodiments, one or more trigger, actuation, or isolation circuits may be born over conductor 638.

Figure 6B:
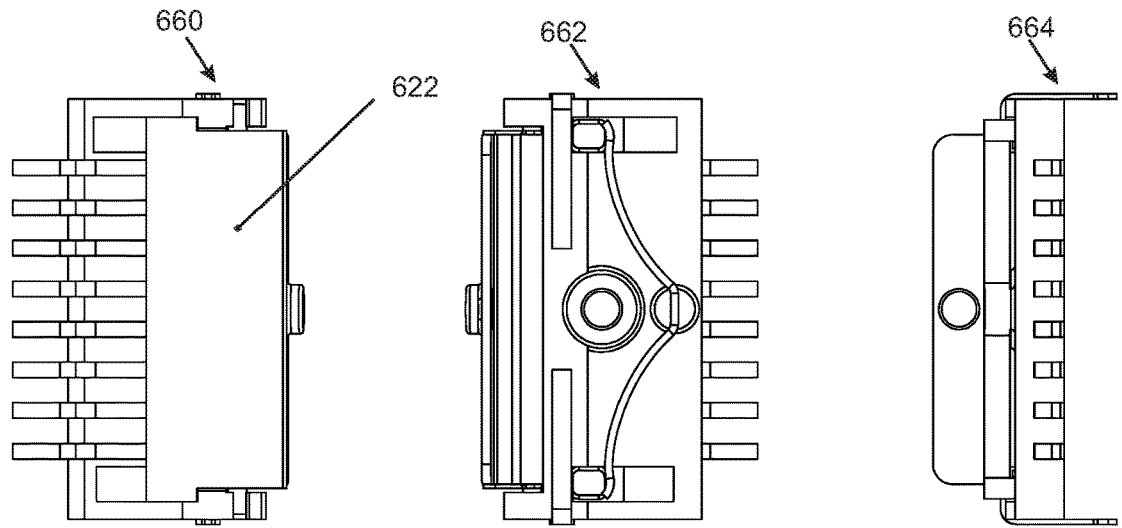
Figure 6B:
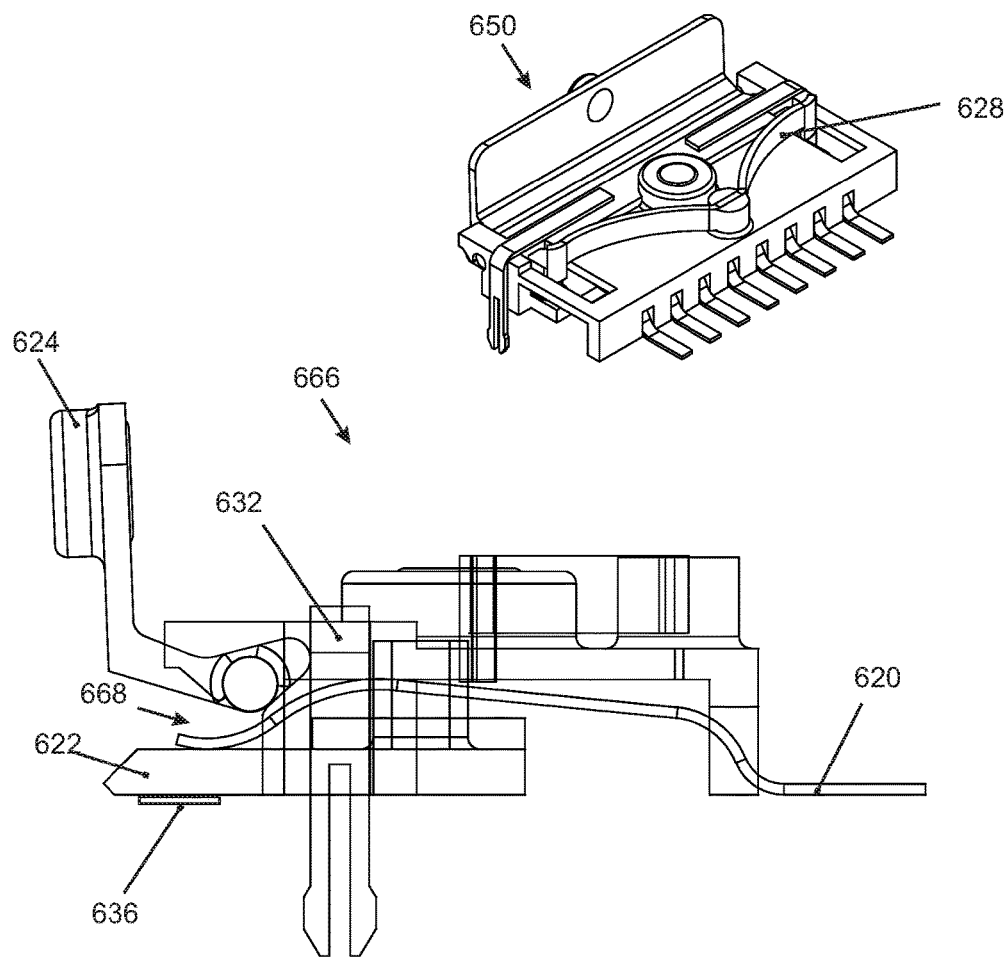

FIG. 6B shows views 660 (bottom), 662 (top), 664 (back), and 666 (end-on, no-hidden lines) of an embodiment of a ganged isolator in its isolated configuration 650. In this configuration, the lever 624 has rotated, moving cam 632 off the electrode contact and allowing the spring 628 to move and hold insulator 622 between the conductor 620 and counter contact 636, bending the conductors into their flexed configurations 668.

Figure 6C:
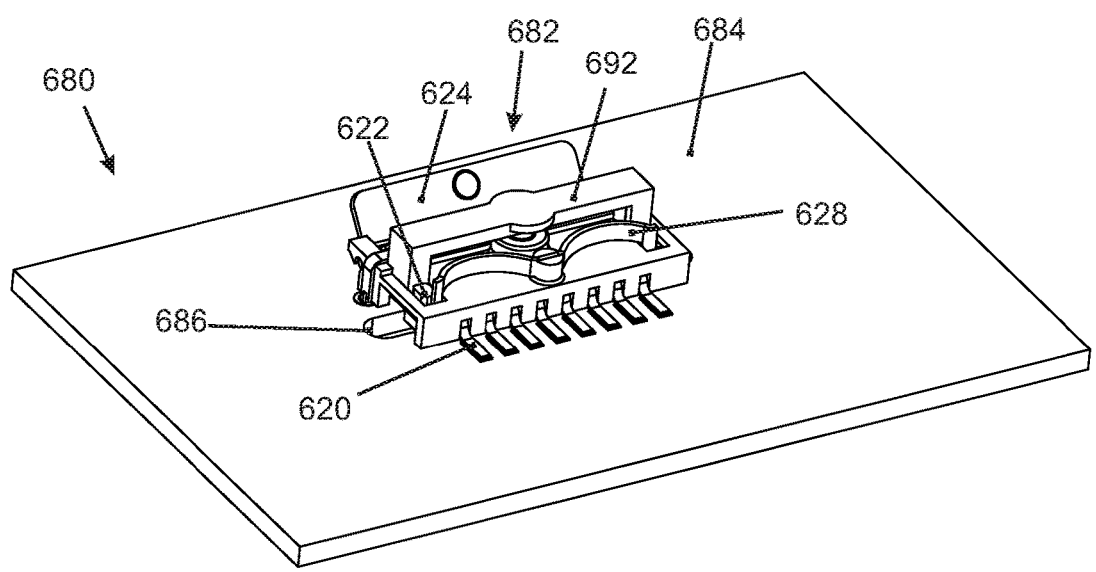
FIG. 6C shows an embodiment of a ganged isolator according to an embodiment of the present invention.

The need for a preload between printed circuit board and isolator may be an issue during printed circuit assembly. FIG. 6C shows an embodiment of a ganged isolator according to the present invention in an assembly configuration 682 positioned on a printed circuit board 684. In this arrangement, a removable clip or carrier 692 is inserted into openings in the isolator to hold the slide 622 back against force from spring 628. In this position, the cam on lever 624 is not engaged so the conductors (e.g., 620) are not pressed onto their counter contacts. Clip 692 may further serve as a carrier for an automated assembly machine.

Some embodiments of printed circuit board layouts associated with a ganged isolator may further comprise a slot 686 for enhanced voltage isolation between contacts.

Figure 7:
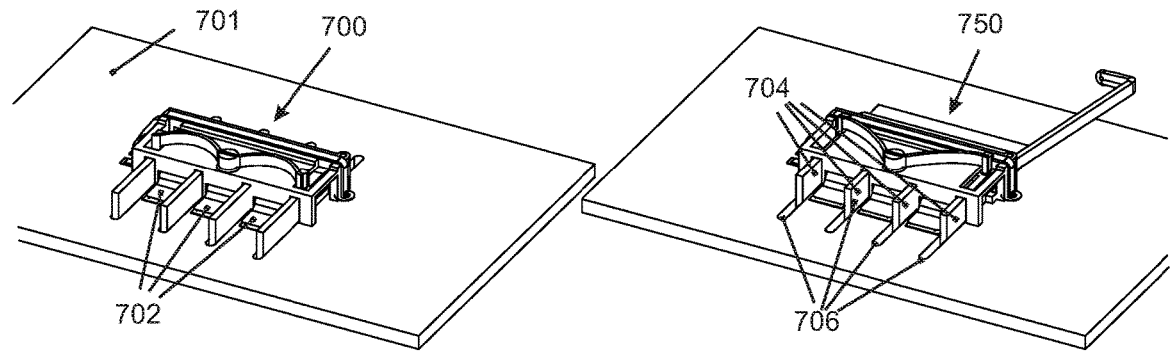
FIG. 7 shows views of an alternative isolator according to an embodiment of the present invention.
Figure 7:
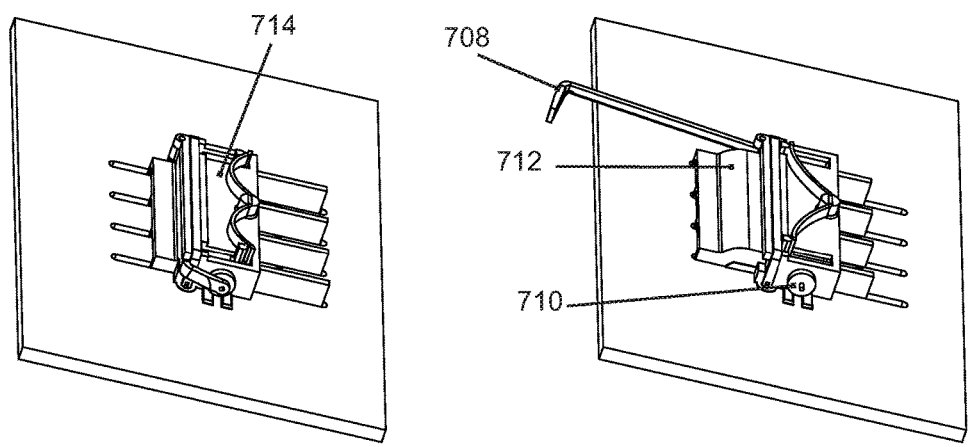
Figure 7:
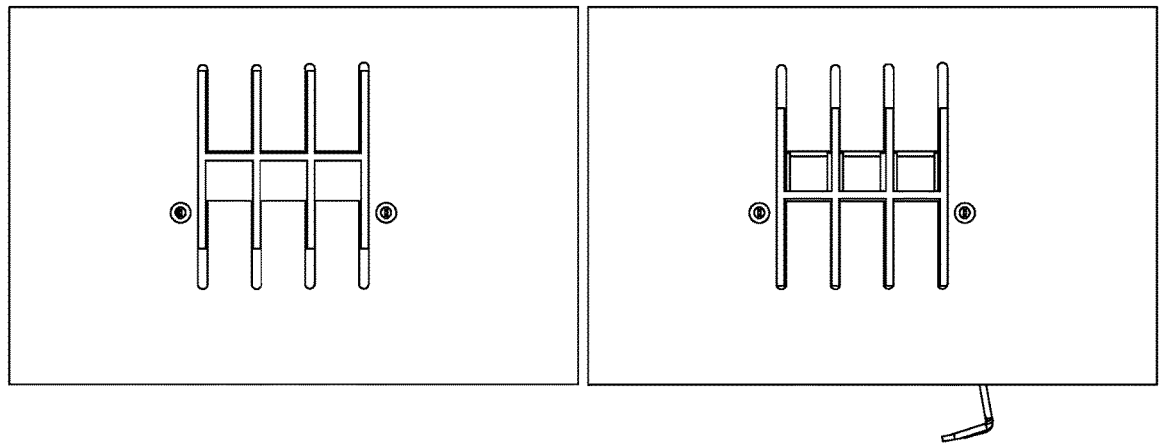

FIG. 7 shows views of an alternative isolator embodiment of the present invention mounted on a printed circuit board 701 in the non-isolated (700) and isolated configurations (750). This embodiment which features enhanced voltage isolation between a plurality of circuits 702 via insulators 704 and printed circuit board slots 706.

Element 708 is a lever that that restrains insulator 712 against the preload of spring 714. Lever 708 is released by an actuator 710 when isolation is triggered, allowing it to pivot out of the way and release insulator 712 to slide forward and isolate contacts similarly to that shown in FIG. 6B. In this embodiment, the insulator provides high-Voltage isolation between adjacent connections as well as between the isolated circuit contacts.

Figure 8A:
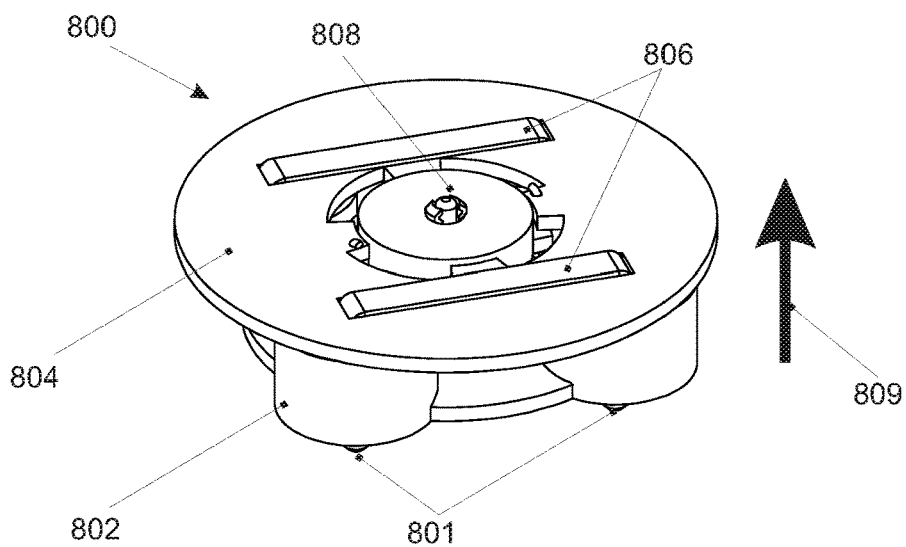
FIGS. 8A and 8B show ganged isolators/actuators according to some embodiments of the present invention.
Figure 8A:
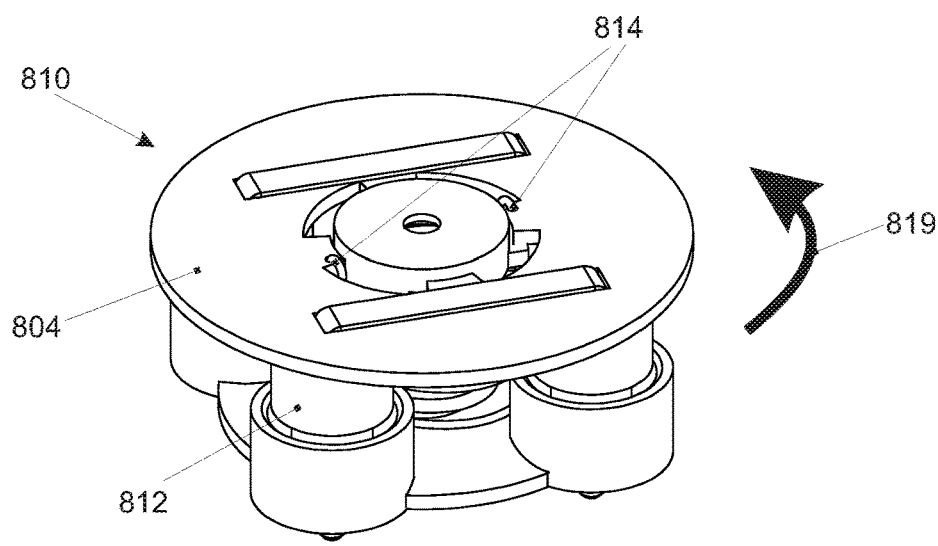
Figure 8A:
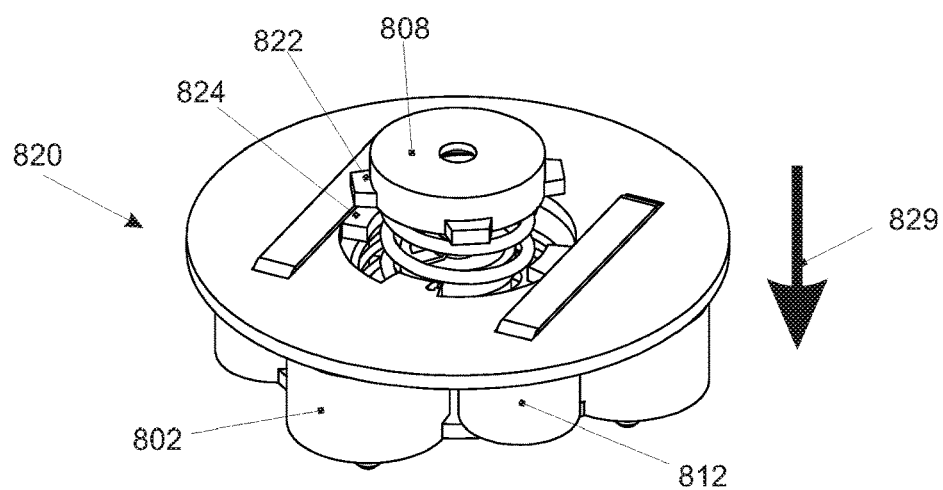

FIG. 8A shows an alternative embodiment of a ganged isolator/actuator in its non-isolated state 800 according to the present invention. Elements 801 are conductive terminals, element 802 is an insulator that holds the terminals and may be mounted to a printed circuit board. Element 804 is an actuatable insulating housing for electrical conductors 806. In the closed configuration these electrical connections jumper between terminals. At the time of actuation, this housing and its conductors are pushed upward (809) by a spring-loaded actuator cap 808. This operation breaks the direct conductor-conductor connection in two places per circuit. This may not actually break the electrical circuit because of high-voltage arcing.

At the end of this vertical actuation, the ganged isolator is in configuration 810. In some embodiments, element 812 is an insulating cylindrical ring as known in the art for increasing creepage distances in high-Voltage circuits. In this position, the actuatable insulating housing commences a rotary motion 819 driven by spring preloads 814.

When this rotary motion reaches its end, tabs on the actuator cap 822 disengage from tabs on the actuated housing 824. The actuated housing then disengages from the actuator cap and is pulled down (829) under a spring preload. Now, both insulators 802 and 812 increase the creepage distance between contacts and this gap is repeated at both terminals of the connection, so this compact design can effectively quench an arc and hold off high Voltage.

Figure 8B:
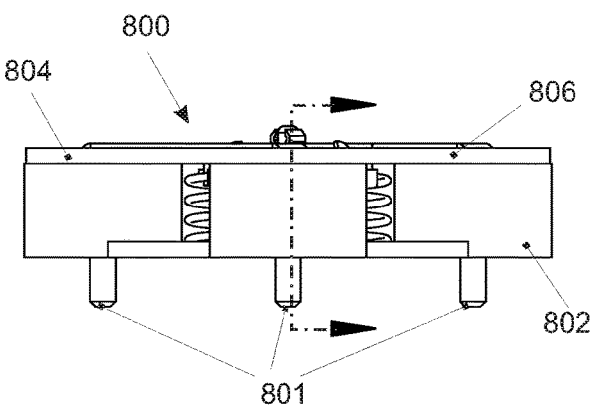
Figure 8B:
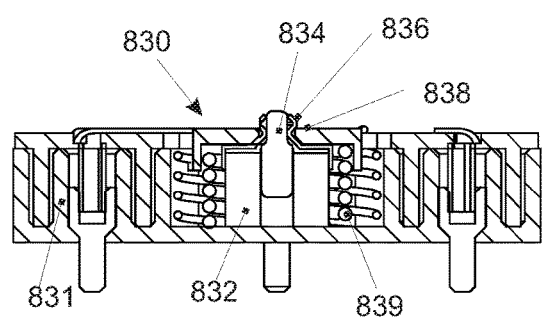
Figure 8B:
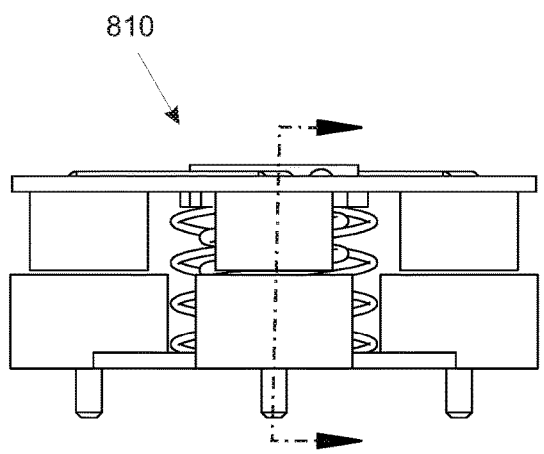
Figure 8B:
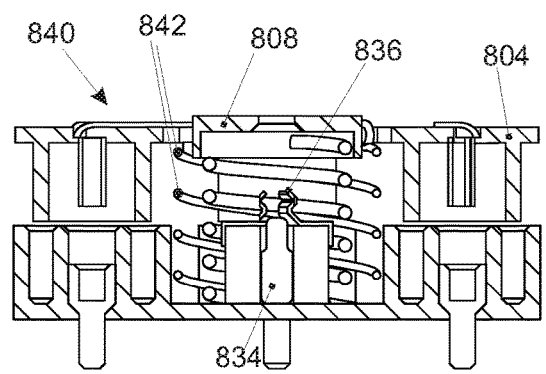
Figure 8B:
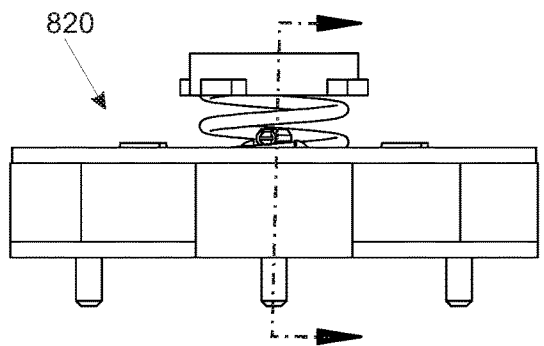
Figure 8B:
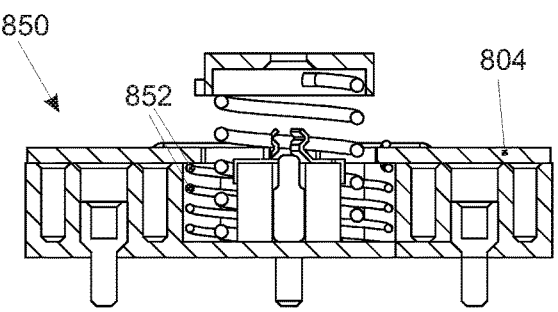

FIG. 8B shows side views of configurations 800, 810, and 820 and their section views 830, 840, and 850, respectively. In some embodiments, element 831 is a second insulating ring used to increase the creepage distance. In this embodiment, element 832 is a solenoid and element 834 is a magnet or magnetically attracted pin. In its position shown in section 830, 834 resists inward motion of a retaining clip 836. This clip bears on the actuator cap 808 at location 836, preventing it from springing upward under the preload of spring 839.

Some alternative embodiments of the present invention employ a linear displacement, rather than a rotary displacement. Some alternative embodiments employ a non-linear displacement.

Section view 840 shows the preload springs that, in part, applies a couple to housing 804 to effect a rotary motion. Pin 834 is in the release position, having moved to allow clip 836 to flex inward and release actuator cap 808.

Section view 850 shows the preload springs in their sprung position 852, having rotated and pulled down the actuated housing 804.

Figure 9A:
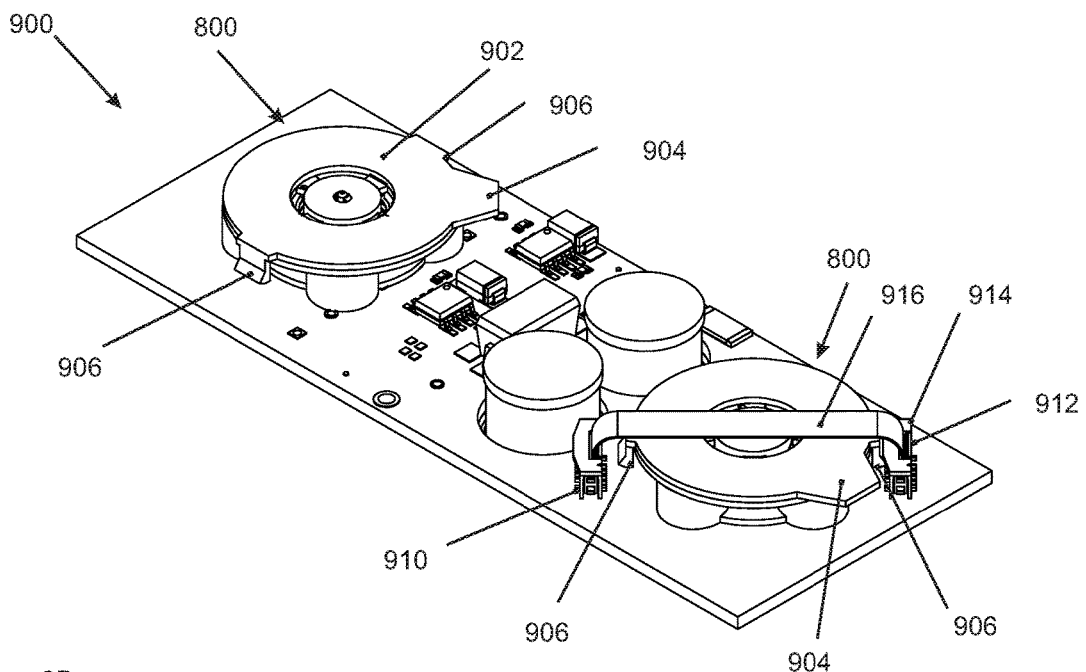
FIGS. 9A and 9B show converter channels according to some embodiments of the present invention.

FIG. 9A shows an embodiment of a converter channel 900 according to the present invention comprising two ganged isolator/actuators in their non-isolated configuration 800. These actuators further comprise an object 902 containing features that augment the behavior of the isolator, including in this embodiment a catch 906 and tabs 904. In some embodiments regions of this object are insulators.

Element 910 and 912 are zero-insertion force flat flex connectors as known in the art. Element 914 is the retaining mechanism of the connectors and element 916 is a flat-flex cable.

Figure 9B:
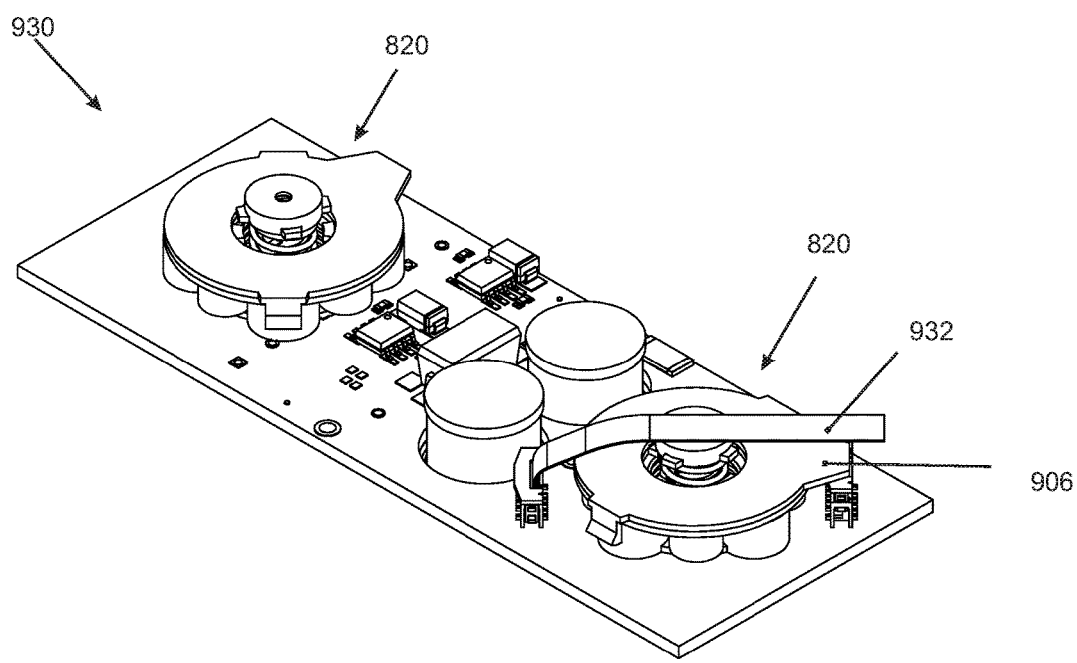

FIG. 9B shows a converter channel embodiment that has been isolated from the interleaved converter by actuating the ganged isolators to their isolated configuration 820. As a consequence of actuation, the object 902 has been lifted and rotated. During the lifting action, a catch 906 mechanically lifts the retaining mechanism of 912. This loosens the connector, allowing the flex cable to be pulled out of the connector into isolated configuration 932 by upward force from the actuator cap. The insulating tab 906 also rotates to cover the otherwise exposed top of the socket for enhanced Voltage holdoff.

Figure 9C:
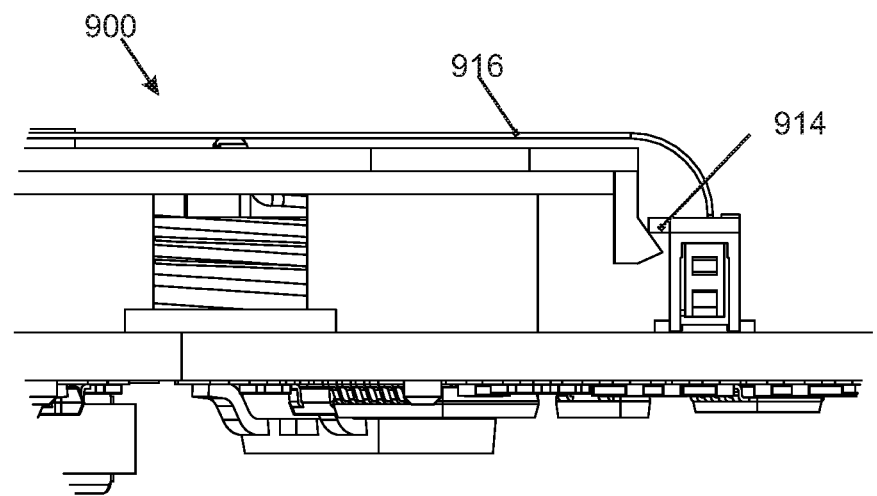
FIGS. 9C and 9D detail side views of disengagement of externally actuated secondary circuits according to some embodiments of the present invention.
Figure 9D:
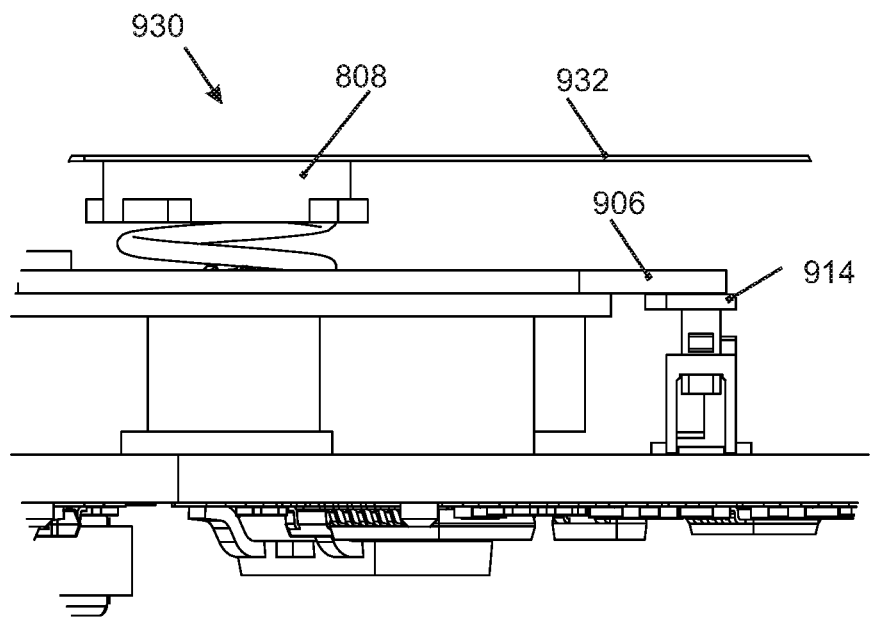

FIGS. 9C and 9D detail side views of this disengagement of externally actuated secondary circuits.

Some embodiments of ganged isolators comprise a means of deterministically time-sequencing the breaking or making of circuit connections. In some embodiments, these means comprise a purposeful elongation, shortening, or bending of a conductive element relative to another. In some embodiments, these means comprise a purposeful relative pocket, indentation, protrusion, or rotation of a cam on an insulator (e.g., 622) or lever (e.g. 624) such that the temporal sequencing occurs mechanically during actuation.

Some embodiments further comprise circuitry to suppress harmful Voltage, current, or noise spikes that may occur at the instant of actuation or in normal operation, isolated or non-isolated. In some embodiments, this circuitry comprises one or more of a diode, a Zener diode, an avalanche diode, a transient voltage suppressor, a crowbar, an SCR, a metal oxide varistor, a ferrite bead, a choke, a capacitor, a resistor, as known in the art.

Figure 10:
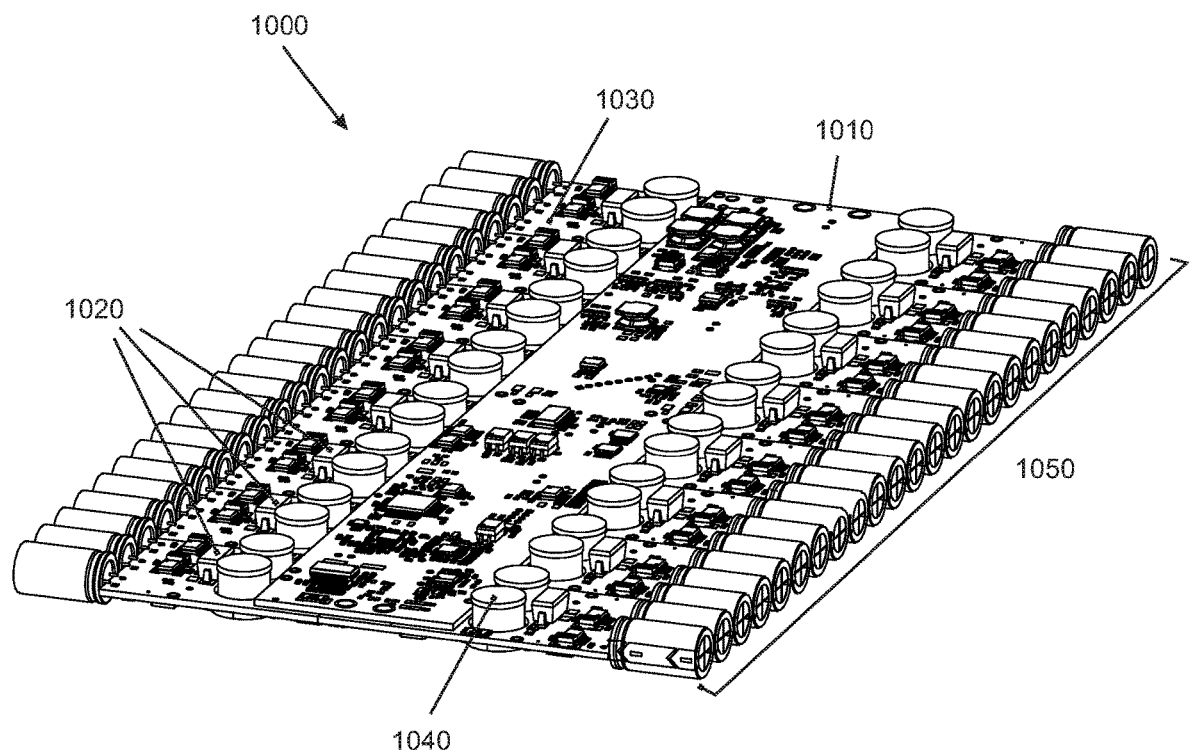
FIG. 10 shows an interleaved inverter according to an embodiment of the present invention.
Figure 10:
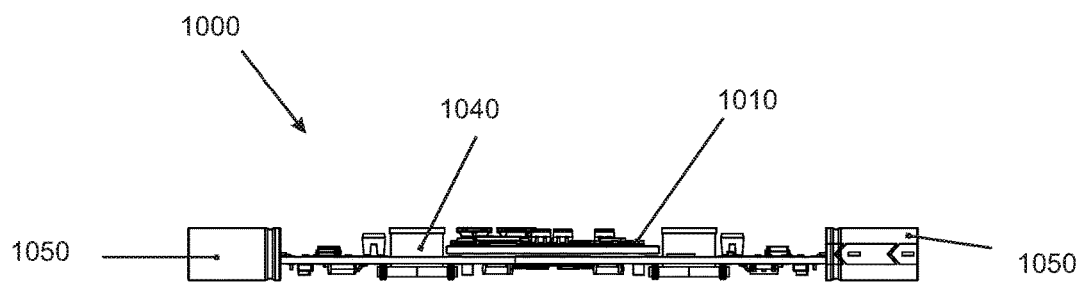

FIG. 10 shows an embodiment of an interleaved inverter 1000 according to the present invention comprising a master board containing circuitry to control converter channels, e.g., that in FIG. 5, in addition to microcontrollers, communications, and power-supply circuitry and an array of converter channels, each containing the circuitry to perform power conversion, e.g., that of FIG. 4. In this embodiment, these boards are arrayed into a single board 1030.

Power inductors 1040 are disposed through holes in the printed circuit board. This allows heat to be drawn from both top and bottom surfaces to a chassis (not shown). It also facilitates current measurements via an inductively coupled printed circuit board trace as described previously.

Some inverters will require more input filter capacitance than is provided by element 1050. In some embodiments, these capacitor banks are arrayed. In some embodiments, these arrays are substantially flat rather than stacked to ensure good thermal communication between each capacitor and external chassis.

Figure 11:
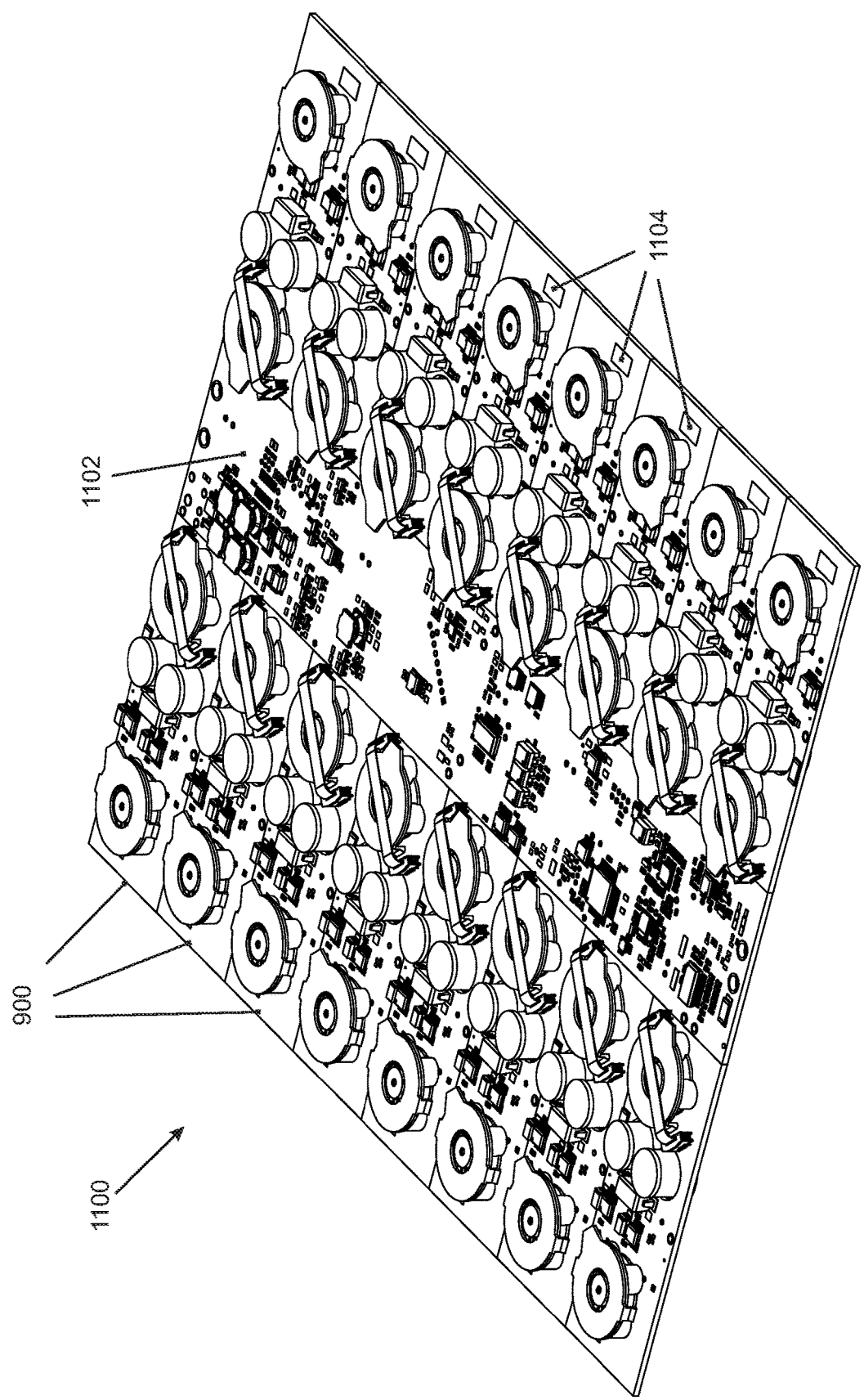
FIG. 11 shows an alternate interleaved inverter according to an embodiment of the present invention.

FIG. 11 shows an alternate interleaved inverter 1100 according to the present invention further comprising an array of converter channel circuits (e.g., 900) containing isolation circuits so failures can be isolated. In this embodiment, the master control is incorporated into the same printed circuit board 1102 as the converter channels. In this embodiment, the arrays of capacitors are removable modules that connect to contacts on the printed circuit board 1104. In some embodiments, capacitor modules are replaceable to extend the service life of the interleaved converter. Some such embodiments comprise field-replaceable, waterproof capacitor modules.

Some embodiments of converter channels are removable and replaceable. Some such embodiments comprise field-replaceable converter channels with water-proof connectors. Some embodiments comprise at least one field-replaceable component.

Figure 12:
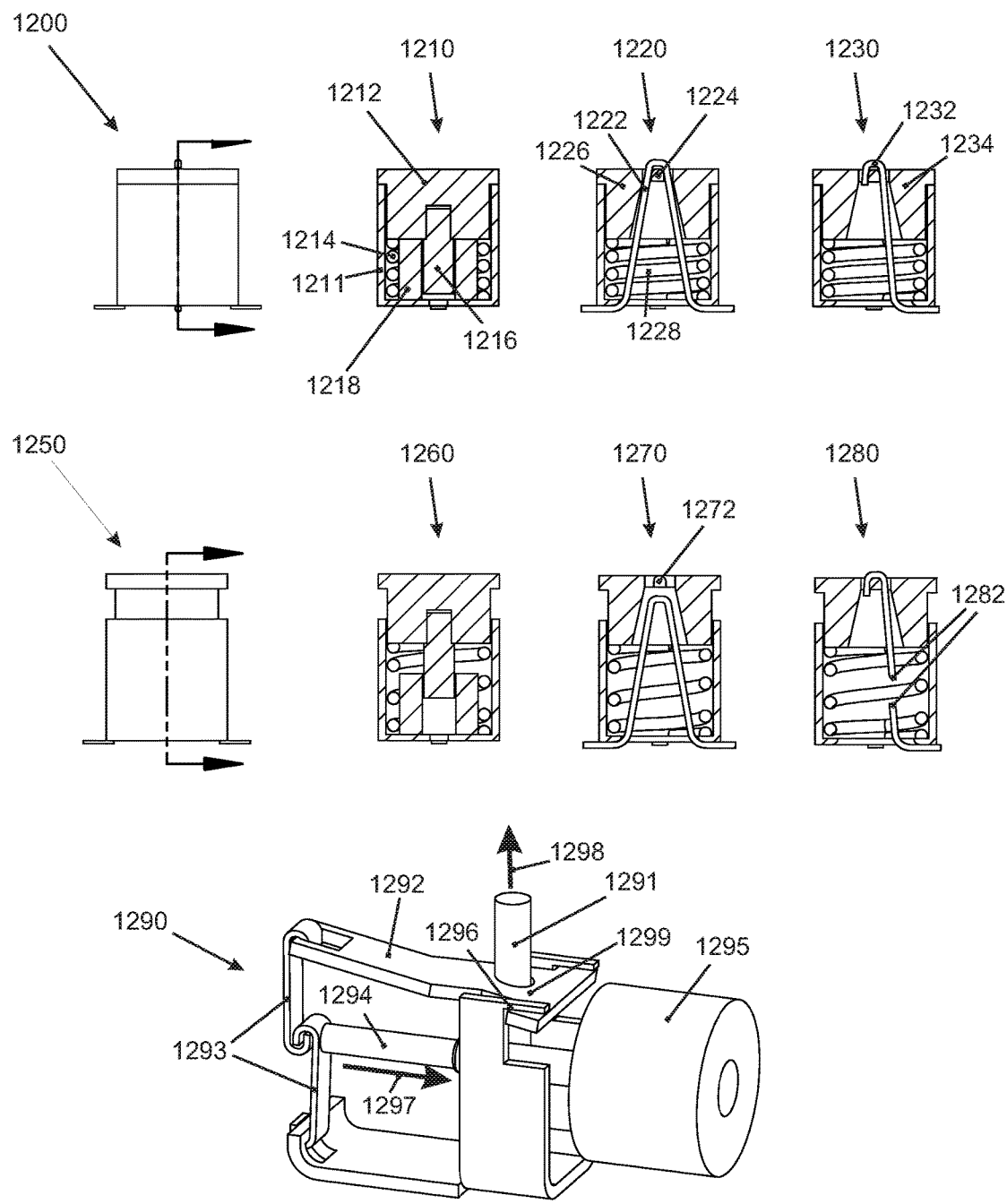
FIG. 12 shows actuators and release mechanisms used in isolators according to some embodiments of the present invention.

FIG. 12 shows embodiments of actuators and release mechanisms used in isolators of the present invention. Assembly 1200 is an actuator assembly in the loaded configuration and assembly 1250 is an actuator assembly in a sprung configuration. Cut-away view 1210 shows an assembly in housing 1211 in which the actuator cap 1212 is held against pressure from spring 1214 by an object 1216 that is held in place by a release 1218. On energizing release 1218, 1216 is freed to move under the spring load allowing the assembly to spring to that shown in cut-away view 1260.

In some embodiments, 1216 comprises a permanent magnet or magnetically attracted material and the release mechanism 1218 comprises a permanent magnet and a solenoid that opposes the permanent magnet's field.

In some embodiments, rod is held against the spring force by friction. In some embodiments, element 1218 contains a material that changes dimension under electrical forcing, such as a piezo-electric, a magneto-strictive or dilative material, an electro-strictive or dilative material. In some embodiments element 1218 contains a material that changes dimension with heat, such as a material having a coefficient of thermal expansion, a bi-metal stack, a shape-memory alloy, etc., and an element that converts electric power to heat. Some embodiments of element 1218 comprise an ultrasonic vibrator.

Some embodiments of 1216 contain surface roughness. Some embodiments of 1216 contain mechanical ratchets, rings, threads and the like. Some embodiments of element 1218 contain surface features that interact with surface features on element 1216.

Some embodiments of actuators shown in 1260 can be reset to configuration 1210 by applying pressure to the actuator cap 1212.

Cut-away view 1220 shows an embodiment of an actuator comprising a heating element 1222 that is actuated to weaken or eliminate a support catch 1224 that restrains the cap 1226 from against force from the spring 1228. Cut-away view 1270 shows this assembly in the sprung configuration. The weakening or elimination process may involve one or more of: melting, sublimation, and chemical reactions. Element 1272 is what remains of support catch 1224 after actuation.

Cut-away view 1230 shows an embodiment of an actuator comprising a fusible conductor 1232. In this embodiment, the circuit through this conductor passes through a conductor in the cap 1234. On actuation, this embodiment springs to the configuration shown in 1280 after the fuse has broken at 1282. Some alternative embodiments comprise a fusible conductor having a shape similar to 1222. Some embodiments neck the conductor to ensure the fuse breaks in a favorable position.

The release assembly 1290 comprises an element 1291 that is restrained against motion 1298 by binding friction or mechanical interlocking with lever 1292, which is held against vertical motion by fulcrum 1296 and by lever assembly 1293. When actuated, solenoid 1295 pulls magnetically attracted element 1294 in direction 1297, which causes lever assembly 1293 to flex inward and apply a downward force with mechanical amplification to the end of lever 1292, which compounds the leverage force releasing the binding friction or mechanical interlocking a surface 1299 and allowing element 1291 to be free to undergo motion 1298. Such mechanical advantage may be useful to trigger an actuation having a large mechanical preload from an actuation of limited distance and force.

While the present invention has been described in terms of specific embodiments, it should be apparent to those skilled in the art that the scope of the present invention is not limited to the embodiments described herein. For example, features of one or more embodiments of the invention may be combined with one or more features of other embodiments without departing from the scope of the invention. The specification and drawings are, accordingly, to be regarded in an illustrative rather than a restrictive sense. Thus, the scope of the present invention should be determined not with reference to the above description, but should be determined with reference to the appended claims along with their full scope of equivalents.

What is claimed is:

1. An electric power converter comprising:
   a master controller and array of converter channels;
   an interleaver circuit that time sequences a substantially evenly time-staggered clock waveform to each converter channel of the array of converter channels, each converter channel establishing a switching synchronized to the clock waveform;
   an analog switch-control signal driven by master controller circuitry that is common to a plurality of converter channels of the array of converter channels; and
   a feedback loop on each converter channel that compares a measured current against the analog switch-control signal to generate an offset Voltage waveform, that further comprises a circuit to sum said offset Voltage waveform on a substantially saw-tooth Voltage waveform, that further applies said sum to a thresholding circuit.

2. The electric power converter of claim 1 wherein the master controller produces the analog switch-control signal based on a comparison of a PWM-generated waveform and an output current-derived waveform.

3. The electric power converter of claim 1 wherein the thresholding circuit comprises a logic gate.

4. The electric power converter of claim 1 wherein the thresholding circuit comprises a comparator.

5. An electric power converter comprising:
   a master controller and array of converter channels;
   an interleaver circuit that time sequences a substantially evenly time-staggered clock waveform to at least a subset of the array of converter channels, each converter channel of the subset establishing a switching synchronized to the clock waveform;
   an analog switch-control signal common to at least the subset of the array of converter channels, the analog switch-control signal being an output of an outer feedback analog circuit that is based on a difference between a microcontroller-generated target signal and a sensed actual signal; and
   a feedback loop on each converter channel that compares a measured current against the analog switch-control signal to generate a control waveform, that further comprises a circuit to sum said control waveform on a substantially saw-tooth waveform, that further applies said sum to a thresholding circuit.

6. The electric power converter of claim 5 wherein the thresholding circuit comprises a logic gate.

7. The electric power converter of claim 5 wherein the thresholding circuit comprises a comparator.

8. The electric power converter of claim 5 wherein the subset of the array of converter channels includes only operational converter channels.

9. The electric power converter of claim 5 wherein the subset includes all converter channels of the array of converter channels.

10. The electric power converter of claim 5 wherein the subset of the array of converter channels is determined from bits of a digital register loaded from a serial digital pulse sequence.

11. The electric power converter of claim 5 wherein the master controller produces the analog switch-control signal based on a comparison of a PWM-generated waveform and an output current-derived waveform.

12. The electric power converter of claim 5 further comprising an analog switch configured to connect more than one sensed signal to a sensed input of the outer feedback analog circuit.

* * * * *